United States Patent
Halbert

(10) Patent No.: US 6,881,900 B2
(45) Date of Patent: *Apr. 19, 2005

(54) CEILING BOX SAFETY MOUNTING BRACKET

(76) Inventor: Alan P. Halbert, 2956 W. 15000 South, Bluffdale, UT (US) 84065

( * ) Notice: Subject to any disclaimer, the term of this patent is extended or adjusted under 35 U.S.C. 154(b) by 0 days.

This patent is subject to a terminal disclaimer.

(21) Appl. No.: 10/723,501

(22) Filed: Nov. 26, 2003

(65) Prior Publication Data

US 2005/0000717 A1 Jan. 6, 2005

Related U.S. Application Data

(60) Provisional application No. 60/484,912, filed on Jul. 3, 2003.

(51) Int. Cl.[7] .................................................. H01H 9/02
(52) U.S. Cl. ........................ 174/58; 174/60; 174/61; 174/62; 174/135; 248/906
(58) Field of Search ..................... 174/58, 60, 63, 174/64, 61, 62, 54, 135; 220/3.2, 3.7, 3.9; 248/343, 906

(56) References Cited

U.S. PATENT DOCUMENTS

| | | |
|---|---|---|
| 3,474,994 A | 10/1969 | Swanquist |
| 3,724,795 A | 4/1973 | Callanan |
| 3,828,315 A | 8/1974 | Blush |
| 3,987,992 A | 10/1976 | Foflygen |
| 4,050,603 A | 9/1977 | Harris et al. |
| 4,062,512 A | 12/1977 | Arnold |
| 4,357,506 A | 11/1982 | Breining |
| 4,399,922 A * | 8/1983 | Horsley ................... 220/3.6 |
| 4,403,708 A * | 9/1983 | Smolik ................... 220/3.5 |
| 4,405,111 A | 9/1983 | Lennon |
| 4,410,160 A | 10/1983 | Alperin et al. |
| 4,463,923 A | 8/1984 | Reiker |
| 4,494,296 A | 1/1985 | Grimes |
| 4,513,940 A | 4/1985 | Alperin et al. |
| 4,513,994 A | 4/1985 | Dover et al. |
| 4,538,786 A | 9/1985 | Manning |
| 4,645,158 A | 2/1987 | Manning |
| 4,666,055 A | 5/1987 | Lewis |
| 4,684,092 A | 8/1987 | Reiker |
| 4,788,383 A | 11/1988 | Caison |
| 4,874,905 A | 10/1989 | Schnell et al. |
| 4,880,128 A | 11/1989 | Jorgensen |
| RE33,147 E | 1/1990 | Reiker |
| 4,892,211 A | 1/1990 | Jorgensen |
| 4,909,405 A | 3/1990 | Kerr, Jr. |
| 4,919,292 A | 4/1990 | Hsu |
| 4,954,667 A | 9/1990 | Jorgensen et al. |
| 4,988,067 A | 1/1991 | Propp et al. |
| 5,009,383 A | 4/1991 | Chapman |
| 5,024,412 A | 6/1991 | Hung et al. |
| 5,044,582 A | 9/1991 | Walters |
| 5,085,392 A | 2/1992 | Perna |
| 5,183,233 A | 2/1993 | LaPalomento |
| 5,234,119 A | 8/1993 | Jorgensen et al. |
| RE34,603 E | 5/1994 | Caison et al. |
| 5,393,026 A | 2/1995 | Deschamps et al. |

(Continued)

Primary Examiner—Dhiru R. Patel

(57) ABSTRACT

The claimed inventions relate generally to electrical boxes that may be installed to a ceiling, and more particularly to electrical box ancillary devices, such as brackets and struts, that permit the carrying of heavy ceiling appliances such as ceiling fans and lighting fixtures. Disclosed herein are brackets and other devices for reinforcing ceiling electrical boxes to structural members, such as trusses and joists, against the load of fixtures including ceiling fans and lighting fixtures. Also disclosed herein are ceiling electrical boxes having built-in reinforcement. Additionally disclosed herein, explicitly or implicitly, methods of using and installing those brackets, devices and boxes. Detailed information on various example embodiments of the inventions are provided in the Detailed Description below, and the inventions are defined by the appended claims.

19 Claims, 18 Drawing Sheets

U.S. PATENT DOCUMENTS

| | | |
|---|---|---|
| 5,407,088 A | 4/1995 | Jorgensen et al. |
| 5,423,507 A | 6/1995 | Florent et al. |
| 5,435,514 A | 7/1995 | Kerr, Jr. |
| 5,503,359 A | 4/1996 | Patterson |
| 5,505,420 A | 4/1996 | Brown |
| 5,522,577 A | 6/1996 | Roesch |
| 5,592,788 A | 1/1997 | Corridon |
| 5,606,147 A | 2/1997 | Deschamps et al. |
| 5,619,263 A | 4/1997 | Laughlin et al. |
| 5,628,418 A | 5/1997 | Deschamps et al. |
| 5,661,264 A | 8/1997 | Reiker |
| 5,710,392 A | 1/1998 | Bordwell et al. |
| 5,824,952 A | 10/1998 | Bordwell et al. |
| 5,845,886 A | 12/1998 | McCormick |
| 5,857,581 A | 1/1999 | Jorgensen |
| 5,860,548 A | 1/1999 | Kerr, Jr. |
| 5,883,331 A | 3/1999 | Reiker |
| 5,909,006 A | 6/1999 | Reiker |
| 5,939,671 A | 8/1999 | Gretz |
| 5,947,436 A | 9/1999 | Bucher et al. |
| 5,950,853 A | 9/1999 | Jorgensen |
| 5,954,304 A | 9/1999 | Jorgensen |
| 5,965,845 A | 10/1999 | Reiker |
| 5,981,874 A | 11/1999 | Reiker |
| 5,988,421 A | 11/1999 | Jorgensen |
| 6,036,154 A | 3/2000 | Pearce |
| 6,095,660 A | 8/2000 | Moriyama et al. |
| 6,096,974 A | 8/2000 | Reiker |
| 6,098,945 A | 8/2000 | Korcz |
| 6,100,469 A | 8/2000 | Jorgensen et al. |
| 6,107,568 A | 8/2000 | Schnell et al. |
| 6,152,413 A | 11/2000 | Gretz |
| 6,173,935 B1 | 1/2001 | Gretz |
| 6,191,362 B1 | 2/2001 | Gretz |
| 6,198,045 B1 | 3/2001 | Roesch |
| 6,204,450 B1 | 3/2001 | Reiker |
| 6,207,894 B1 | 3/2001 | Reiker |
| 6,207,897 B1 | 3/2001 | Reiker |
| 6,207,898 B1 | 3/2001 | Reiker |
| 6,242,696 B1 | 6/2001 | Reiker |
| 6,281,439 B1 | 8/2001 | Reiker |
| 6,291,768 B1 | 9/2001 | Reiker |
| 6,303,859 B1 | 10/2001 | Reiker |
| 6,355,883 B1 | 3/2002 | Gretz |
| 6,394,857 B1 | 5/2002 | Crochet |
| 6,465,736 B1 | 10/2002 | Spadaro |
| 6,491,270 B1 | 12/2002 | Pfaller |
| 6,494,682 B1 | 12/2002 | Blateri et al. |
| 6,501,201 B1 | 12/2002 | Whitener et al. |
| 6,503,099 B1 | 1/2003 | Kerr, Jr. |
| 6,505,960 B1 | 1/2003 | Schubert et al. |
| 6,513,959 B1 | 2/2003 | Serizawa et al. |
| 6,517,216 B1 | 2/2003 | Cercone et al. |
| 6,541,720 B1 | 4/2003 | Gerald et al. |
| 6,545,216 B1 | 4/2003 | Bell et al. |
| RE38,120 E | 5/2003 | Bordwell et al. |
| 6,573,446 B1 | 6/2003 | Umstead et al. |
| 6,578,321 B1 | 6/2003 | Layne |
| 6,582,106 B1 | 6/2003 | Jamison |
| 6,586,672 B1 | 7/2003 | Kobus et al. |
| 6,586,679 B1 | 7/2003 | Bashford |
| 6,588,711 B1 | 7/2003 | Onishi |
| 6,588,920 B1 | 7/2003 | Agro |
| 6,590,155 B1 | 7/2003 | Vrame et al. |
| 6,595,476 B1 | 7/2003 | Edwards |
| 6,595,479 B1 * | 7/2003 | Johnson et al. ............. 248/343 |
| 6,595,664 B1 | 7/2003 | Bucher et al. |
| 6,597,129 B1 | 7/2003 | Newman |
| 6,598,846 B1 | 7/2003 | Lackey, Jr. |
| 6,600,102 B1 | 7/2003 | Wu |
| 6,602,079 B1 | 8/2003 | Chiriku et al. |
| 6,722,621 B1 * | 4/2004 | Johnson ..................... 248/343 |
| 6,734,356 B1 * | 5/2004 | Gretz ........................ 174/58 |
| 6,756,541 B1 * | 6/2004 | Mollick et al. ............... 174/58 |

* cited by examiner

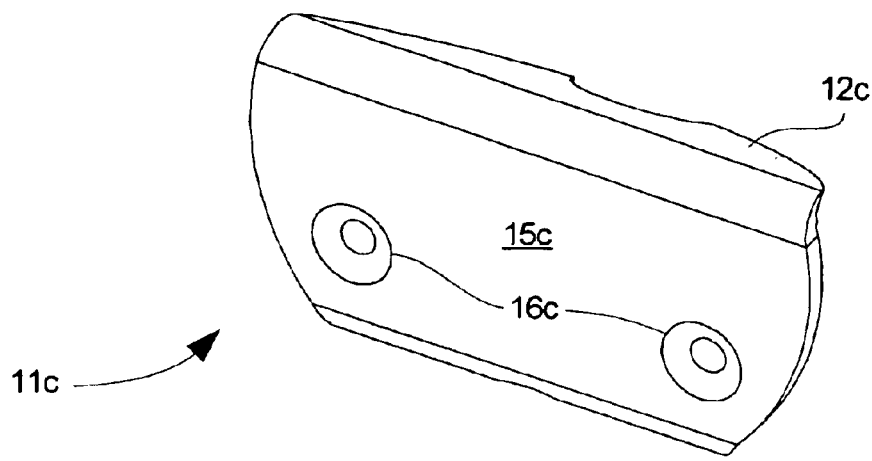
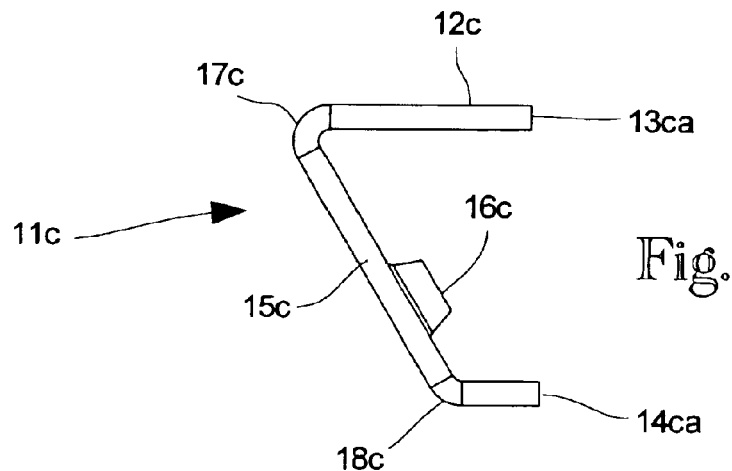
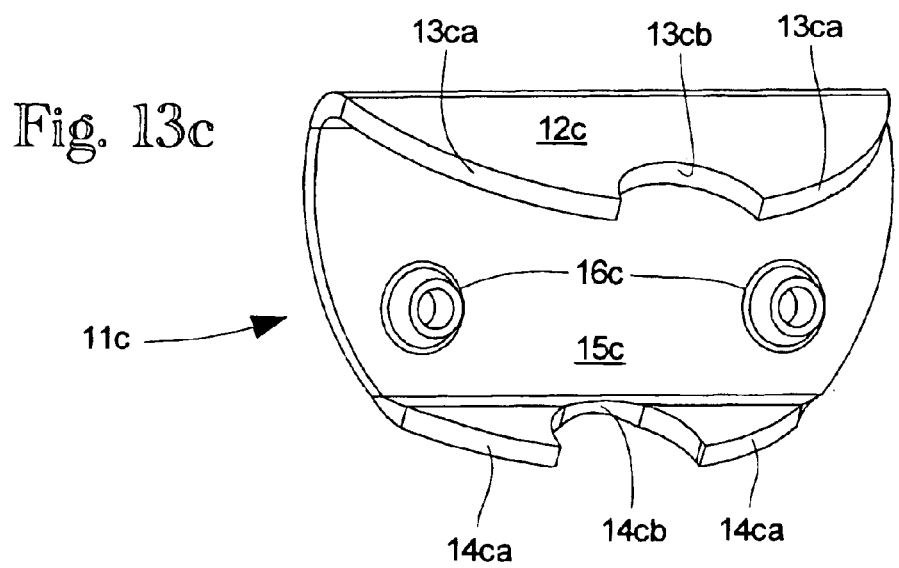

CEILING BOX SAFETY MOUNTING BRACKET

CROSS-REFERENCE TO RELATED APPLICATIONS

This application claims the benefit of U.S. Provisional Application No. 60/484,912 filed Jul. 3, 2003 which is hereby incorporated by reference in its entirety.

BACKGROUND OF THE INVENTIONS

Known in the art are electrical boxes intended to enclose wiring and connectors, those boxes also optionally including mountings for securing a lighting fixture. Certain of those boxes are suitable for mounting overhead just above a ceiling, attaching to a truss, joist or other structural support member. In a typical new installation metal or, more frequently, plastic light-duty boxes are installed, those being the most inexpensive type suitable for carrying a light-weight lighting fixture, for example a fixture housing a single medium-base bulb. It is often the case that a homeowner will wish to later install a heavier fixture, such as a ceiling fan or chandalier, to the originally installed electrical box. Many homeowners are not aware of the unsuitability of these light-weight boxes for those applications, and many install these heavier fixtures improperly and dangerously without upgrading the support structure.

A ceiling fan, through normal operation, may create oscillatory stresses on the electrical box it is attached to. If attached to a light-duty box, these forces may carry through the fan support to the electrical box, which may cause the box to twist slightly on each oscillation. Over time this motion may cause the nails, or other fasteners, used to secure the electrical box to move and/or loosen, which may lead to failure of the electrical box supporting structure. Additionally, if the box structure is not sufficiently rigid, forces may be transferred to the drywall, or other material, of the ceiling. Now drywall, plaster, paneling and most other ceiling materials are not designed to carry loads. These materials may carry a load briefly, but over time cracks may develop leading to an unpredictable failure of the material. If both the electrical box supporting structure and the ceiling material fail, the result is a fixture falling at an unpredictable time, which can lead to property damage, personal injury and litigation against the makers of the ceiling fan, lighting fixture, electrical box manufacturer as well as other involved parties.

In many areas earthquakes are a concern. A non-moving ceiling fixture mounted to a light-weight box may carry a load sufficiently well under static conditions for many years. Earthquakes are unpredictable events that may occur at any time, and in some locations with such severity as to cause large thrust and oscillatory motions on the lighting fixture and electrical box. A homeowner may be completely unaware of a dangerously supported fixture until a tremor causes it to fall. The dangers of inadequately supported lighting fixtures therefore encompasses more fixtures than ceiling fans.

Now there are several electrical box types which will support a relatively heavy load, of which several are represented in U.S. patents. A usual type, represented by U.S. Pat. No. 6,242,696 utilizes wings attached to the side of the electrical box to attach to a structural member. This type requires installation prior to the installation of a finished ceiling to avoid damage thereto. Another type, represented by U.S. Pat. Nos. RE 38,120, 6,107,568, 6,191,362, 6,207,897 and 6,355,883 envisions a ceiling electrical box that attaches to an overhead structural support member from underneath through the use of screws or other fasteners generally driven upward through the top of the box and into the structural member. Those boxes either include a slot fitting the support member, or are designed to fit in a space between the support member and the surface of the finished ceiling. All of those designs have the disadvantage of reduced internal box volume, by which the number of electrical connections and wires is restricted over a common side-mounted nailed electrical box. Another type, represented by U.S. Pat. Nos. RE 33,147, 6,098,945, 6,465,736, and 6,595,479 utilizes an extendable rod or other structure fittable between the space between two joists or structural members. This type of electrical box, although avoiding impacts into the volume of the electrical box, carries a number of disadvantages. First, the use of the rod introduces a substantial lever arm; the rod must therefore be fairly heavy to avoid bowing under the fixture load. This type of box is typically constructed of steel or other metal, as the needed plastic supports would be very thick in comparison. These boxes tend are more complex and require more materials and building steps to fabricate. The cost of this type of box tends to be much higher to the end user. A final type, represented in U.S. Pat. Nos. RE 34,603 and 6,100,469, utilizes fasteners through a metal electrical box sidewall into the adjacent structural member. This type relies on the strength of the sidewall to avoid the fastener head pulling through the sidewall material under load, and is therefore unsuitable for plastic materials. Furthermore, this type relies on the box structure to resist a downward force, which may place strain on welds and joints. Additionally, fasteners driven in a substantially horizontal direction limit the amount of driving force that can be applied to the fastener and may make installation difficult without specialized tools. And none of these box types provide a method of upgrading a ceiling electrical box to carry additional load.

Thus, some of these boxes are relatively expensive to produce and install, while others may be installed only by creating new holes in a ceiling or otherwise causing new damage that must be repaired. In the market there is a general lack of products and methods that provide for upgrading of ceiling electrical boxes to support heavier loads. There is therefore a need for products which can create a box structure capable of supporting more than a light load which can be installed without causing damage to an existing ceiling.

BRIEF SUMMARY OF THE INVENTIONS

The claimed inventions relate generally to electrical boxes that may be installed to a ceiling, and more particularly to electrical box ancillary devices, such as brackets and struts, that permit the carrying of heavy ceiling appliances such as ceiling fans and lighting fixtures. Disclosed herein are brackets and other devices for reinforcing ceiling electrical boxes to structural members, such as trusses and joists, against the load of fixtures including ceiling fans and lighting fixtures. Also disclosed herein are ceiling electrical boxes having built-in reinforcement. Additionally disclosed herein, explicitly or implicitly, methods of using and installing those brackets, devices and boxes. Detailed information on various example embodiments of the inventions are provided in the Detailed Description below, and the inventions are defined by the appended claims.

BRIEF DESCRIPTION OF THE DRAWINGS

FIGS. 13a, 13b and 13c show an additional alternate reinforcing bracket.

A discussion of several embodiments in accordance with the invention now follows.

DETAILED DESCRIPTION

Figure 1A:
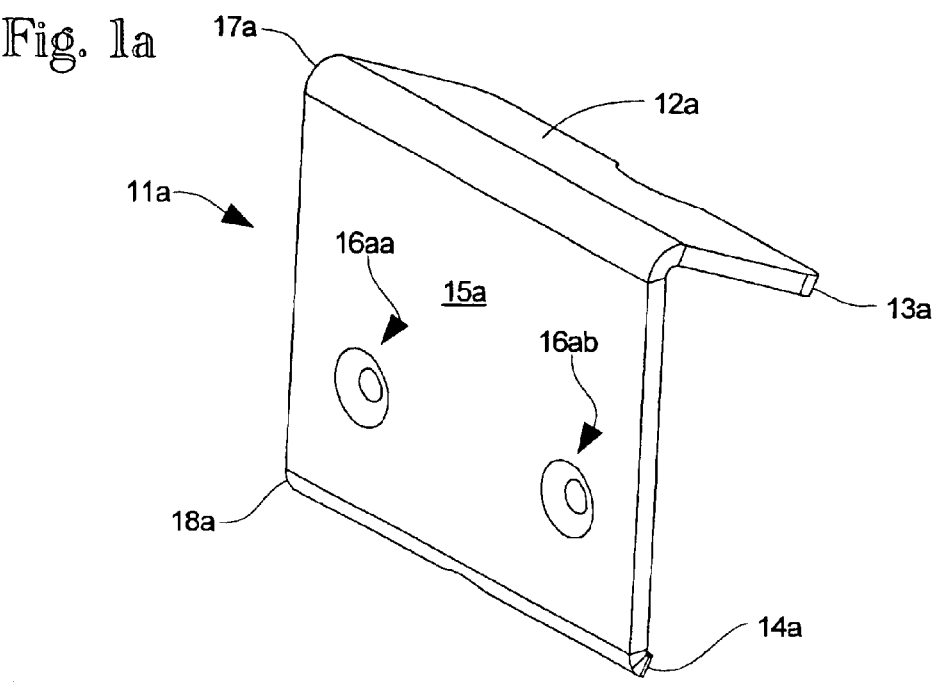
FIGS. 1a, 1b and 1c (herein after referred to as FIG. 1) show an exemplary reinforcement bracket.
Figure 1B:
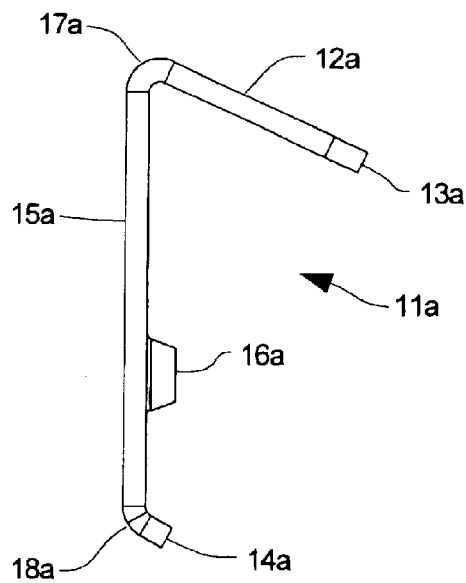
Figure 1C:
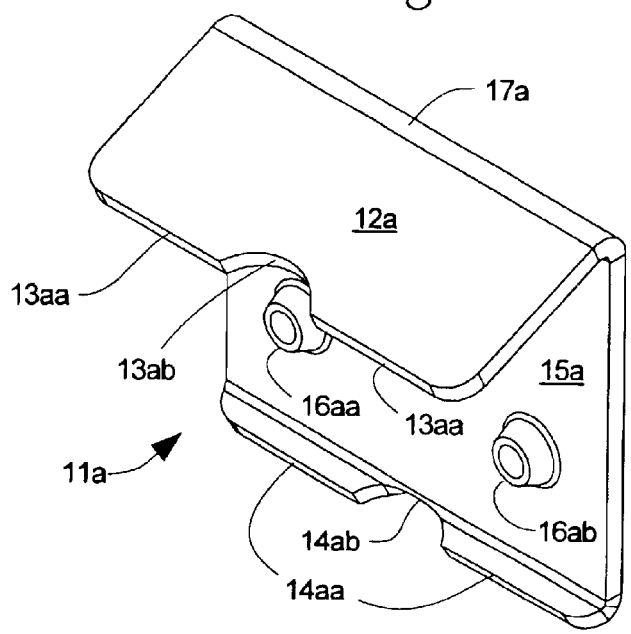

Disclosed herein are several brackets useful for reinforcing electrical boxes installed adjacent to a structural member, such as a truss or joist. Shown in FIGS. 1a, 1b and 1c (herein after FIG. 1) is an example of one particular reinforcement device in the form of a bracket designed for two specific electrical box types, although it might be installed in others. Bracket 11a includes two largely planar portions, 12a and 15a, connected by bend 17a. Planar portion 12a, in this example, forms an interface providing a mating to the top of an electrical box at the inside. The ends of planar portions 12a and 15a are shaped to form an interface to the side of an electrical box at the inside, that interface being shown at 13a and 14a. In this example, ends 13a and 14a provide two interfaces for two specific electrical box types, as will be discussed presently, one interface provided at 13aa and 14aa for a substantially flat electrical box sidewall and another interface at 13ab and 14ab for a screw boss, which are integral in many plastic electrical ceiling boxes. Planar portion 15a provides a strut-like portion providing resistance to a compressive force applied between the top and side interfaces. That strut-like portion functions to at least partially convert a downward force on the electrical box to a horizontal force in the direction of the structural member. In bracket 11a, two fastener features, in this example recesses, 16aa and 16ab (shown 16a in FIG. 1b) provide attachment points for screws. Recesses 16aa and 16ab are oriented so that fasteners inserted therein may fasten the bracket 11a through the electrical box sidewall and into an adjacent structural member. In this example, recesses 16aa and 16ab are configured to align fasteners at approximately 60 degrees from the vertical for an electrical box mounted to a vertical structural member surface. This permits the fasteners to be driven into the structural member with a single tool, such as an ordinary screwdriver or hammer, through many electrical box openings. It is preferred that this angle and the position of any fastener features be set so as to permit ease of access to the fasteners using ordinary tools, although other angles or positions may be chosen without departing from the larger scope of the invention. Preferably, the driving force may be directly applied by a tool external to the electrical box, for example a screwdriver or hammer. Recesses 16aa and 16ab may include a substantially cylindrical portion, not shown, for guiding the fastener at a desired angle relative to the bracket. In this example, recesses 16aa and 16ab provide seats for screws, which recesses are not threaded to provide free movement so that bracket 11a may be brought tightly into a supportive position. A bend 18a is provided near end 14a to orient that end perpendicular to the electrical box sidewall providing for transverse motion by which bracket 11a may be brought more snugly into a supportive position during installation of the bracket.

The bracket 11a of FIG. 1 may be fashioned utilizing ordinary sheet-metal die-processing procedures to make the various bends and and shapes of the bracket, as well as other reinforcing brackets. Preferred materials for reinforcing brackets, such as 11a, include zinc-plated mild steel, due to that material's strength, durability, widespread availability and applicable manufacturing facilities. Other metals may be used, such as aluminum, brass or "pot" metals, keeping in mind that different thicknesses may be required to achieve necessary strength and bracing characteristics. Processes other than die processes may be used as desired, for example extrusion processes, particularly where a bracket is to be made from aluminum or its alloys.

Figure 2A:
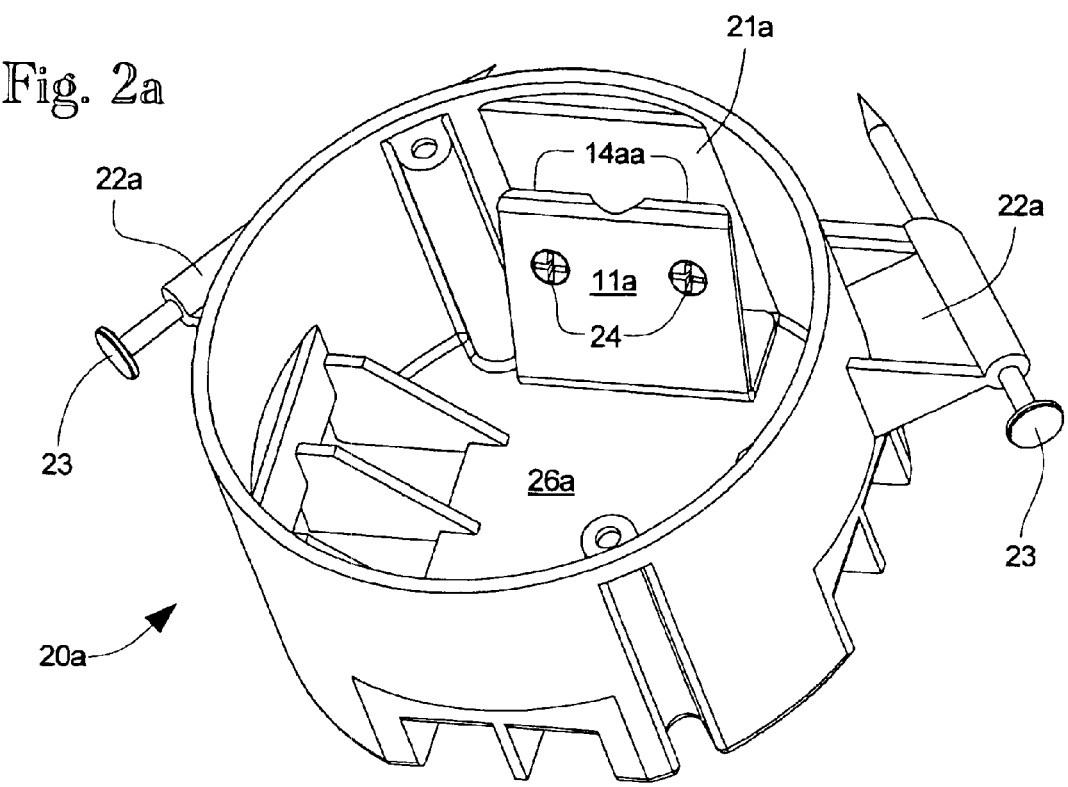
FIGS. 2a, 2b and 2c show a four inch plastic electrical box with the bracket of FIG. 1 installed.
Figure 2B:
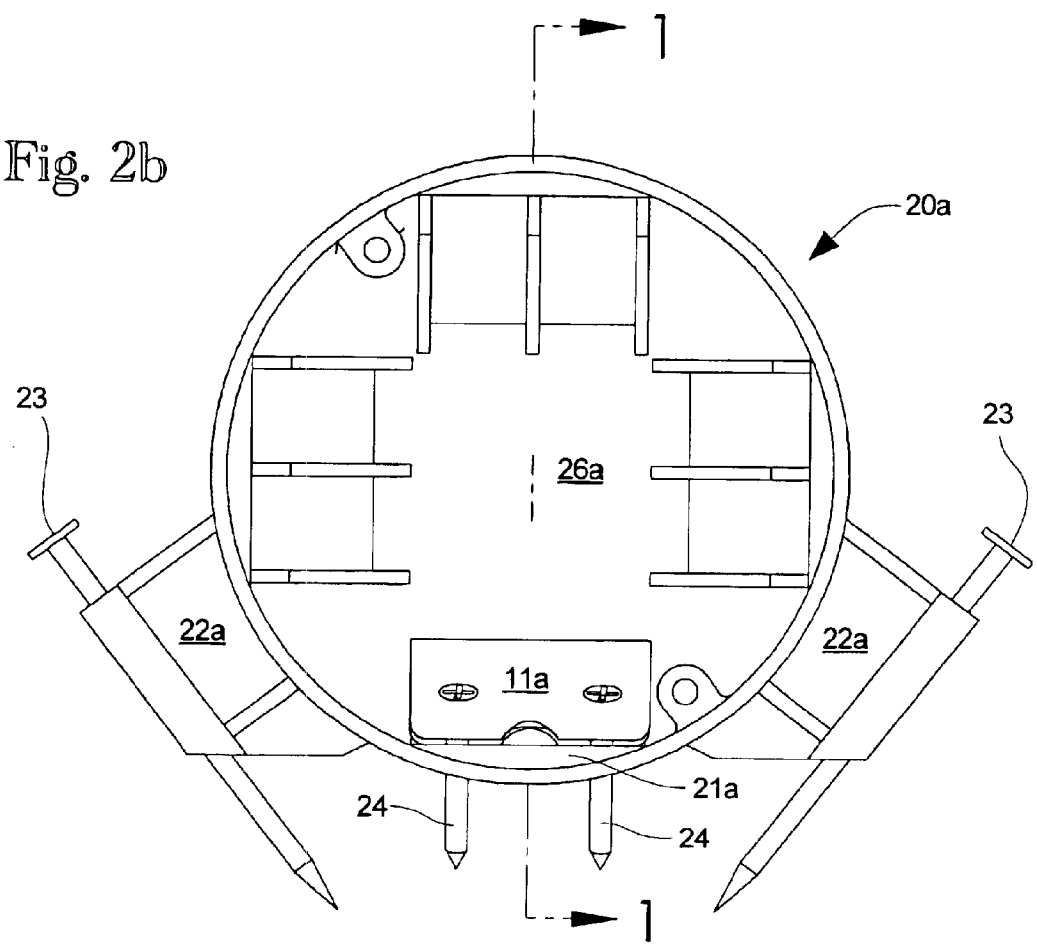
Figure 2C:
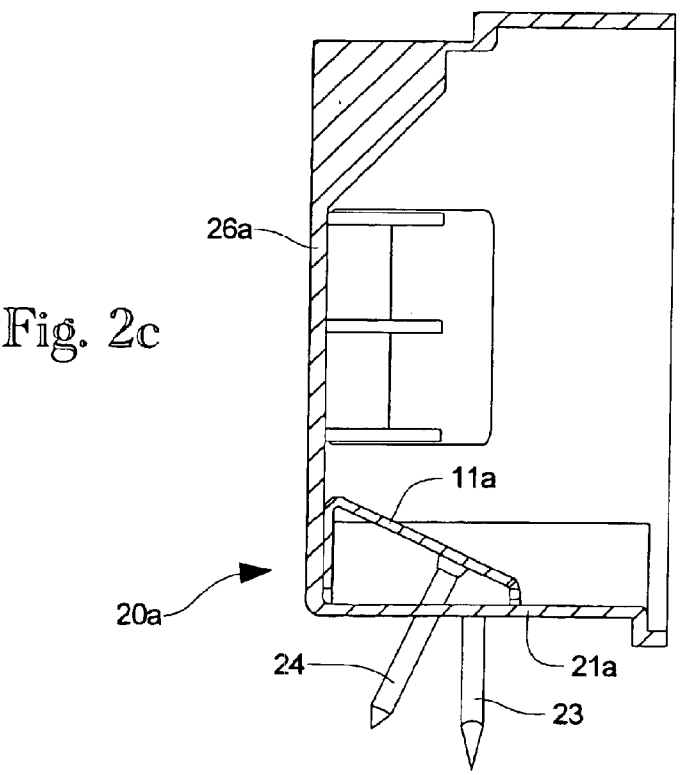

Shown in FIGS. 2a, 2b and 2c (herein after FIG. 2) is a four inch plastic electrical box 20a with bracket 11a installed; FIG. 2a showing a perspective view through the electrical box opening, FIG. 2b showing a bottom view, and FIG. 2c showing a sectional view through axis 1. Electrical box 20a includes an aperture through which access is permitted to manipulate wires inserted into the electrical box and to make connections thereto. Electrical box 20a includes flanges 22a for holding nails 23 in a relative position whereby nails 23 may be driven into a support member to secure the box 20a into position. When bracket 11a is in installed position, top mating interface 12a (not shown) rests against the electrical box top inside surface 26a, while side interface 14aa resting against a flat portion 21a of electrical box sidewall. Screws 24 are driven through bracket 11a and sidewall 21a into the structural member to secure the bracket 11a into installed position.

Figure 3A:
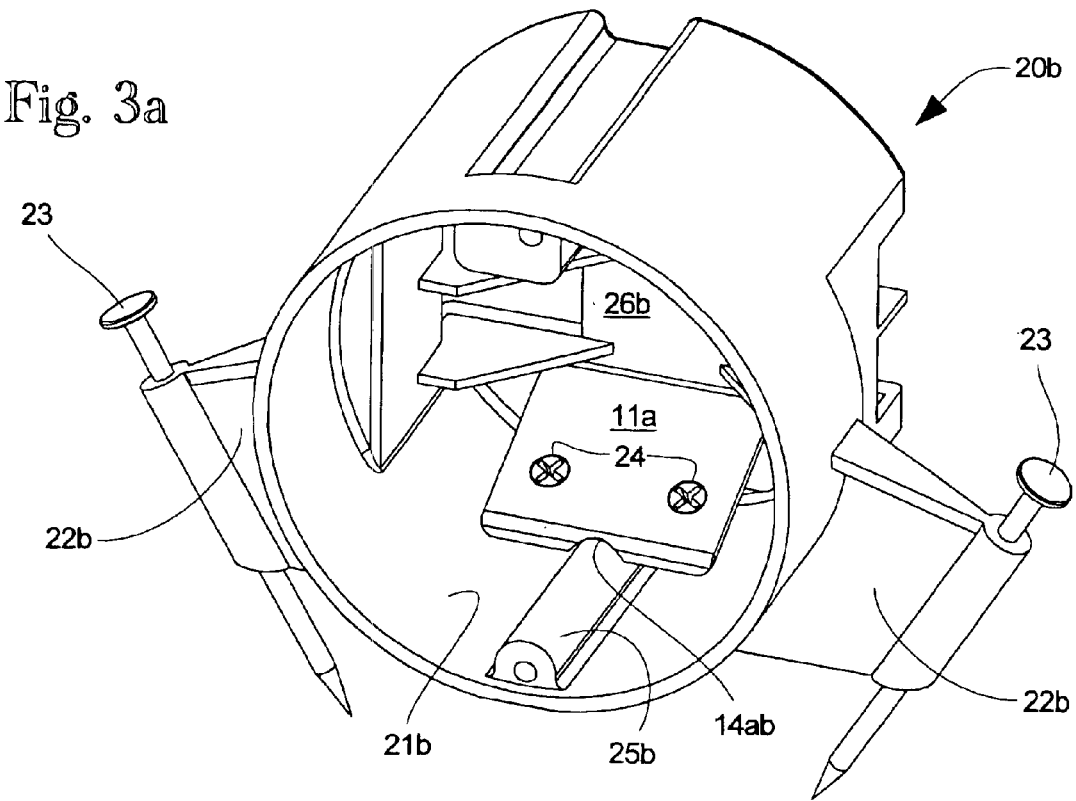
FIGS. 3a, 3b and 3c show a three inch plastic electrical box with the bracket of FIG. 1 installed.
Figure 3B:
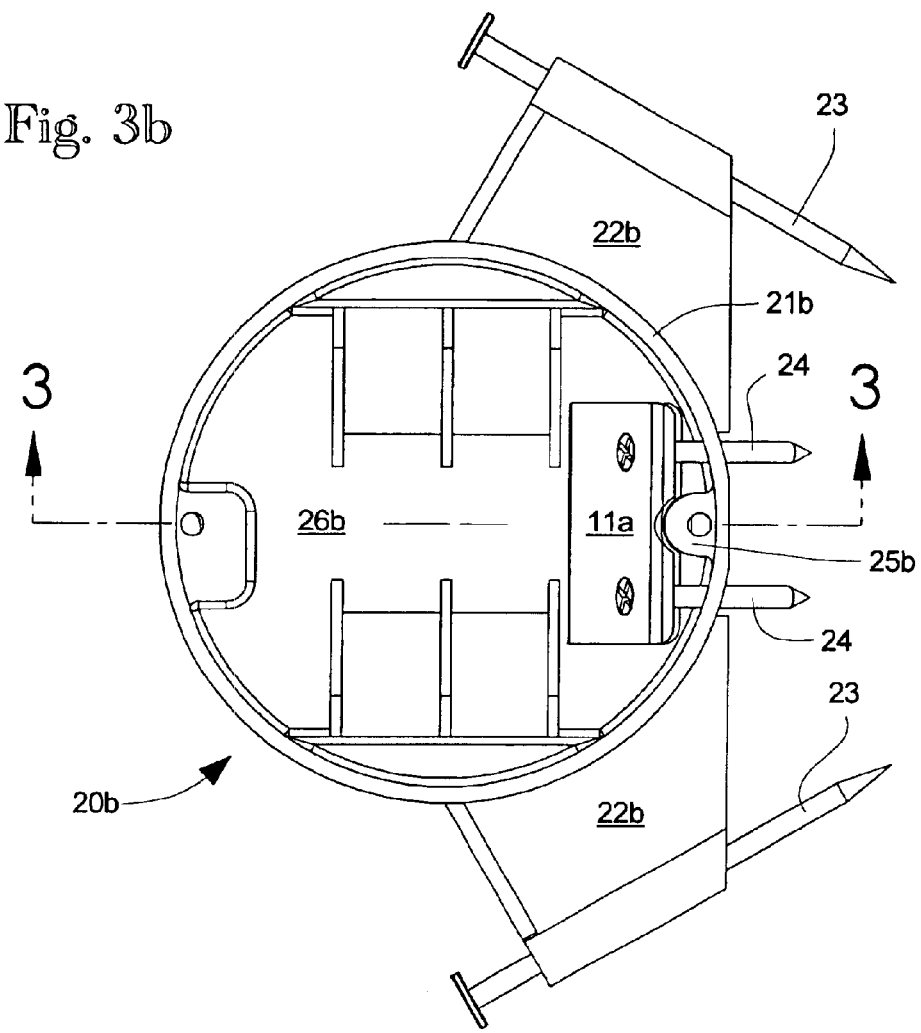
Figure 3C:
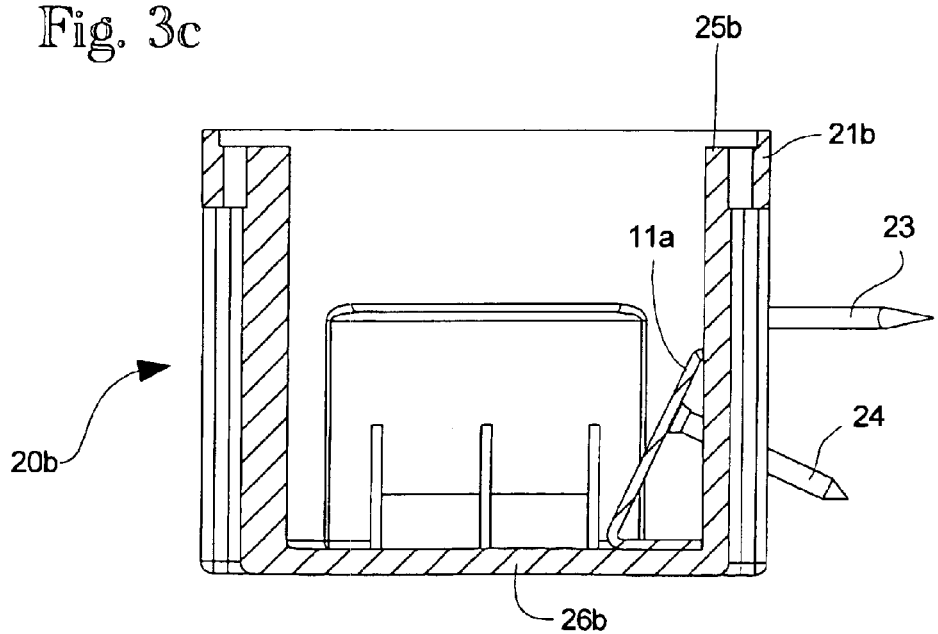

Bracket 11a is designed to reinforce two particular box types. FIGS. 3a, 3b and 3c (herein after FIG. 3) show a three inch plastic electrical box 20b with bracket 11a installed therein, with FIG. 3a showing a perspective view through the electrical box opening; FIG. 3b showing a view looking at the bottom, and FIG. 3c showing a sectional view through axis 3. Electrical box 20b also includes flanges 22b for fastening the box 20b to a structural member by way of nails 23. For this box, the installation position of bracket 11a also brings top mating surface 12a (not shown) against electrical box top inside surface 26b. This electrical box 20b includes a boss 25b for insertion of a mounting screw, whereby a fixture may be attached to electrical box 20b. Bracket 11a rests against boss 20b at the side interfaces 14ab and optionally 13ab (not shown). Screws 24 are likewise driven through bracket 11a and sidewall 21b into the structural member to secure the bracket 11a into installed position.

Figure 4A:
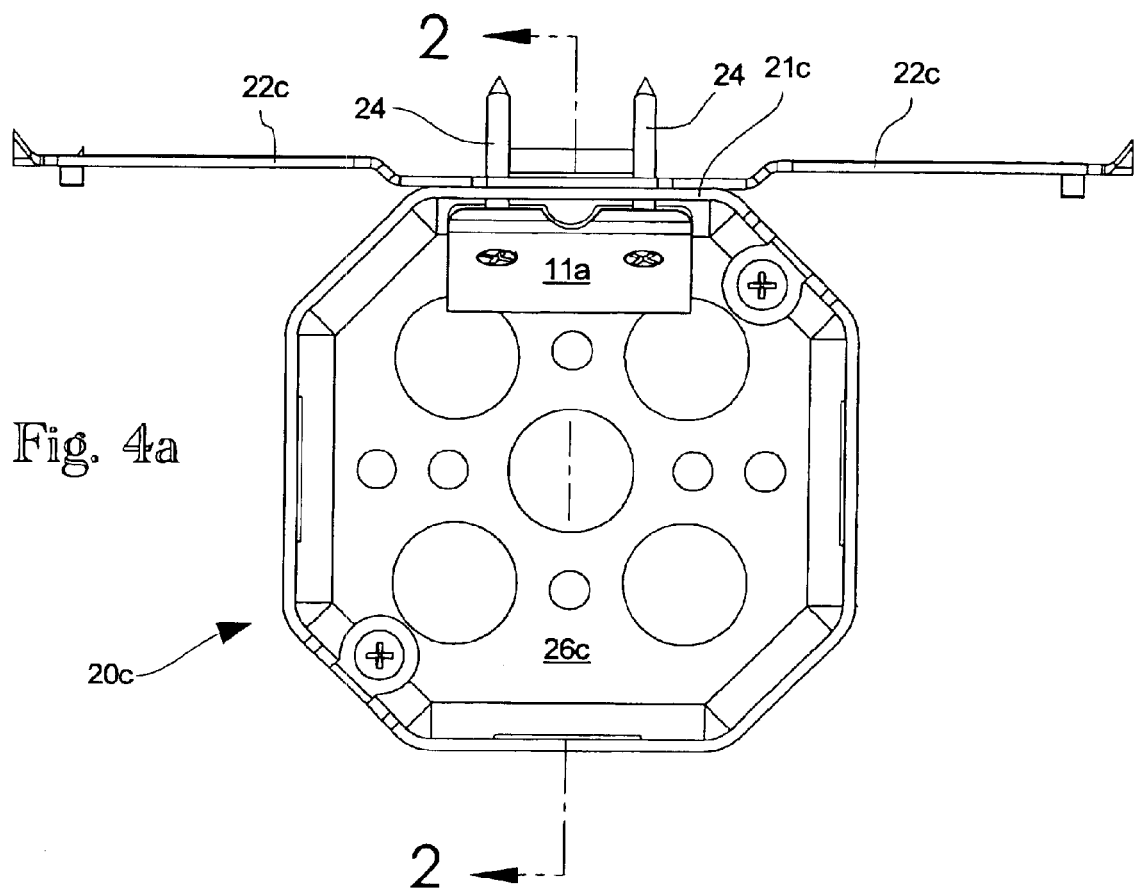
FIGS. 4a, 4b and 4c show a three inch metallic electrical box with the bracket of FIG. 1 installed.
Figure 4B:
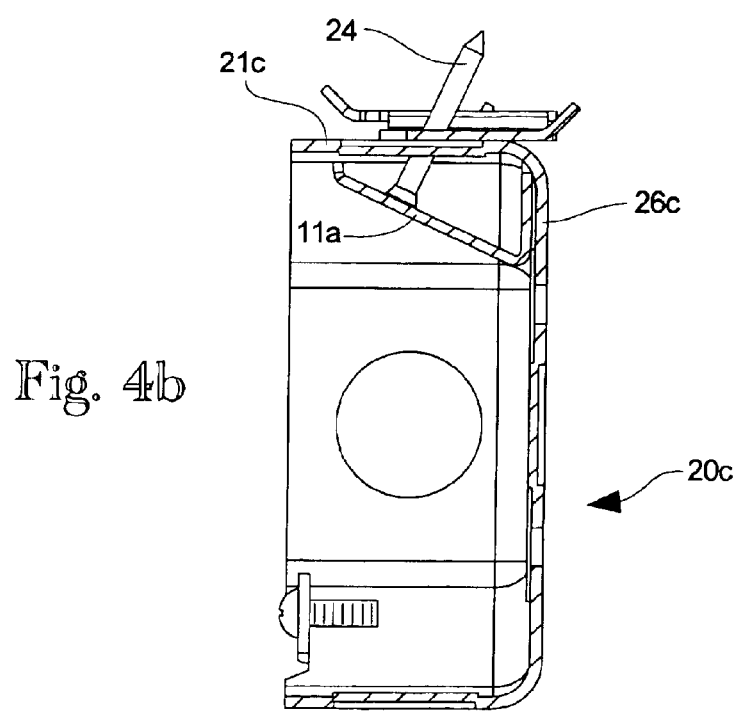
Figure 4C:
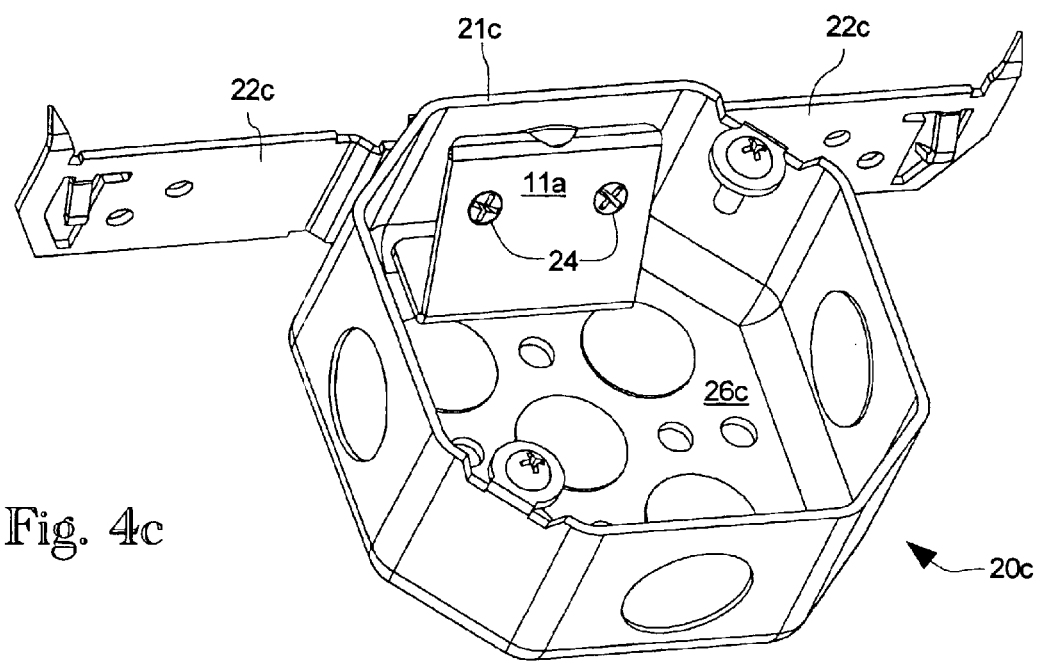

The design of bracket 11a permits use in metallic electrical boxes as well. In FIGS. 4a, 4b and 4c a bracket 11a is shown installed into a 3 inch metal-type electrical box 20c, with FIG. 4a showing a view from the box bottom, FIG. 4b showing a sectional view through axis 2, and FIG. 4c showing a perspective view. This electrical box 20c includes alignment wings 22c with holes pre-formed to permit fastening to a structural member with nails, screws, or other fasteners. As in the plastic boxes, bracket 11a mates top mating surface 12a against the top of the electrical box 26c, and also mates side interface 14aa against electrical box sidewall 21c. To secure, screws 24 are driven through bracket 11a and sidewall 21c into the structural member, although pre-drilling of holes through sidewall 21c may be necessary if holes are not formed therein prior to installation.

Figure 5A:
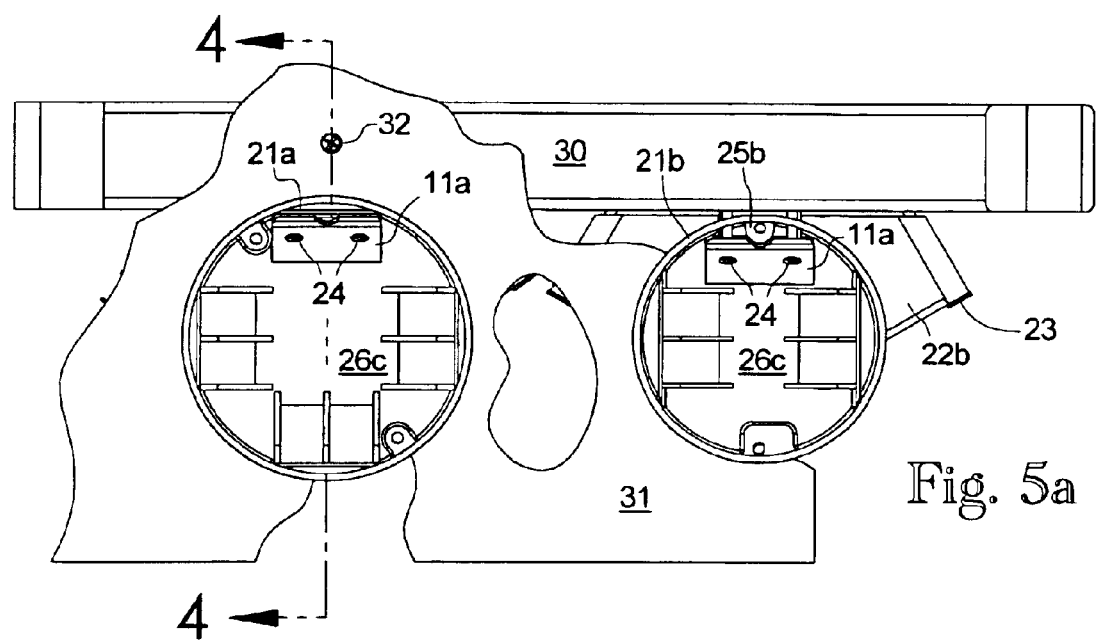
FIGS. 5a, 5b and 5c show an installation of two identical brackets into two types of electrical boxes.
Figure 5B:
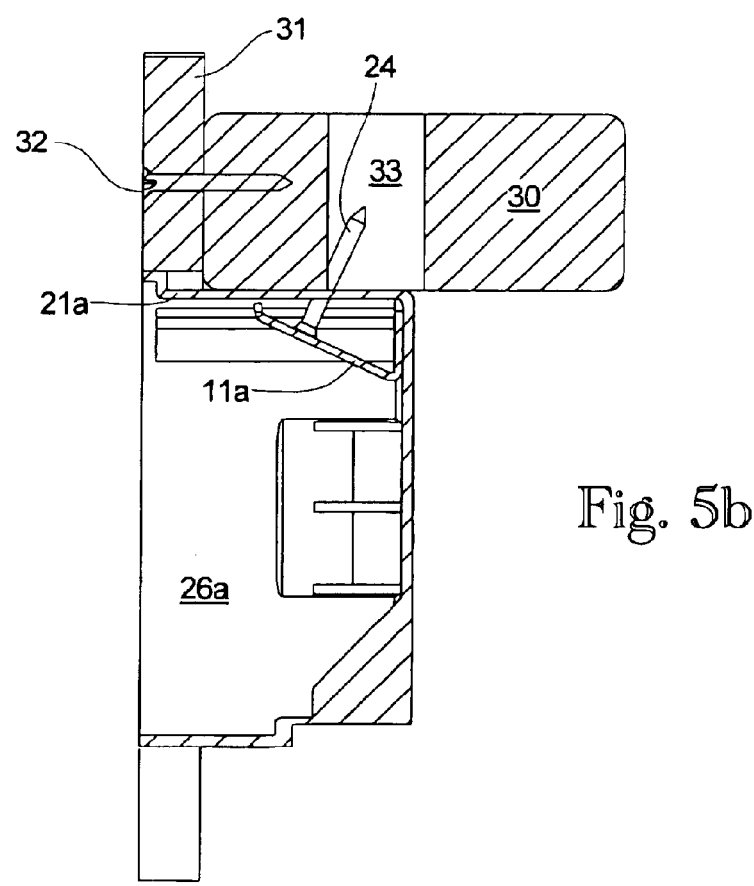
Figure 5C:
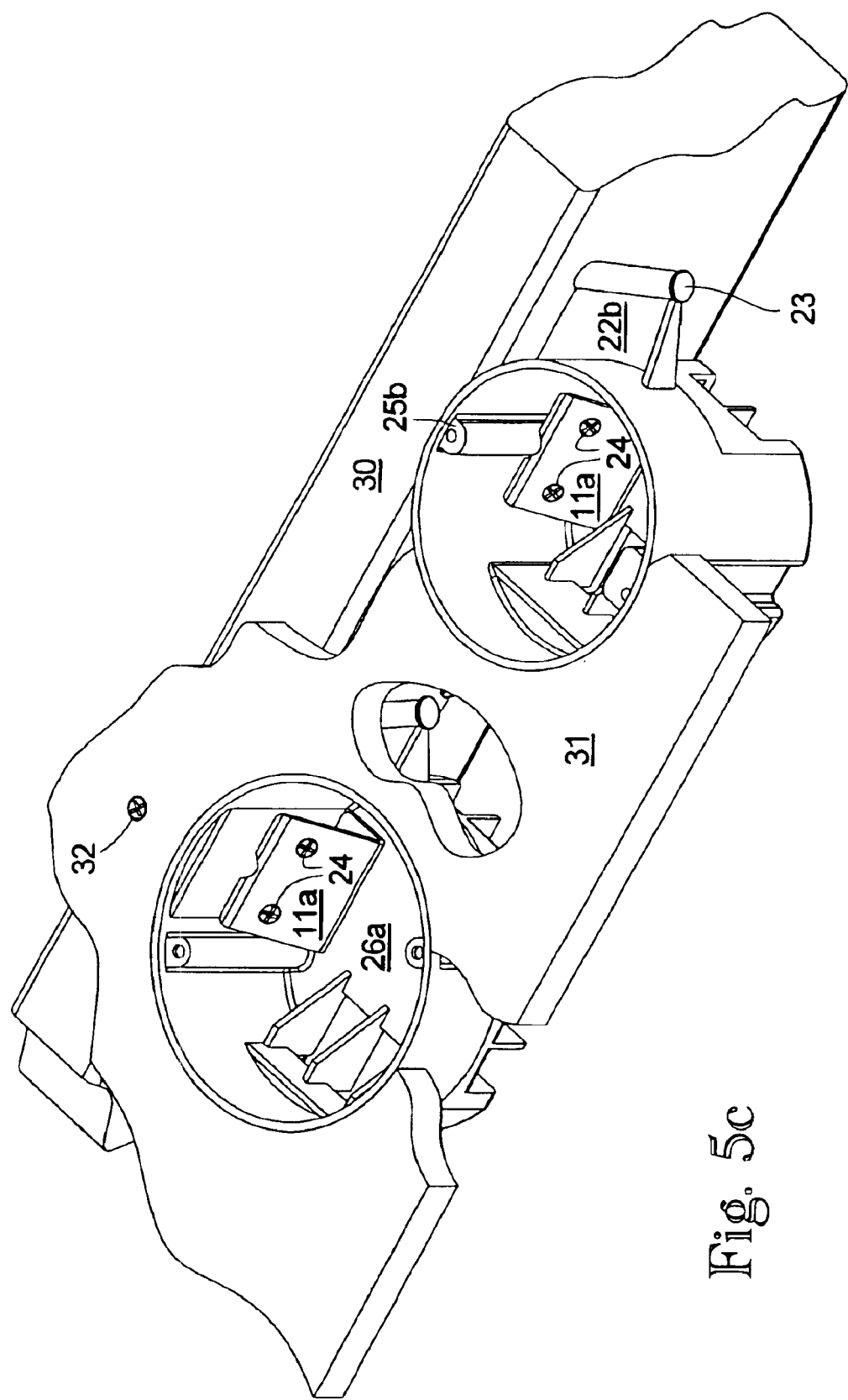

FIGS. 5a, 5b and 5c further illustrates the installation of two brackets of the type shown in FIG. 1 using two electrical box types; FIG. 5a showing a view looking up through the bottom of the electrical boxes and at the ceiling, FIG. 5b showing a sectional view about the axis labeled 4, and FIG. 5c showing an inverted perspective view (turned upside down for ease of viewing). Ordinary and modem construction utilizes wood structural members, of which one member 30 is shown. Member 30 might be the lower portion of a truss, a joist, or other structural member upon which a ceiling is to be fashioned. Ordinary construction utilizes drywall 31 fastened by nails or screws to structural members, one screw 32 being shown. Also shown are a four inch plastic electrical box 26a of the type of FIG. 2 and one three inch plastic electrical box 26b of the type of FIG. 3. Both boxes 26a and 26b are normally installed prior to drywall application to structural member 30 through flanges, one 22b being shown, and nails 23. Drywall 31 is applied afterward, and holes cut therein to provide access to the interior of the electrical boxes. After drywall 31 is installed, access to structural member 30 may be restricted, particularly if there is little or no access space surrounding structural member 30. In other situations access may be inconvenient, for example where structural member 30 is the lower part of a truss accessible through an attic or other space. A bracket 11a may be installed without direct access to structural member 30 through the interior of the box. The bracket 11a is inserted into the box and placed in proper mounting position, next to the electrical box sidewall adjacent to the structural member. Screws 24, or other fasteners, are then driven through the bracket 11a, the electrical box sidewall 21a or 21b and into the structural member 30. FIG. 5b includes a cutout 33 area to show screw 24 clearly.

Figure 6A:
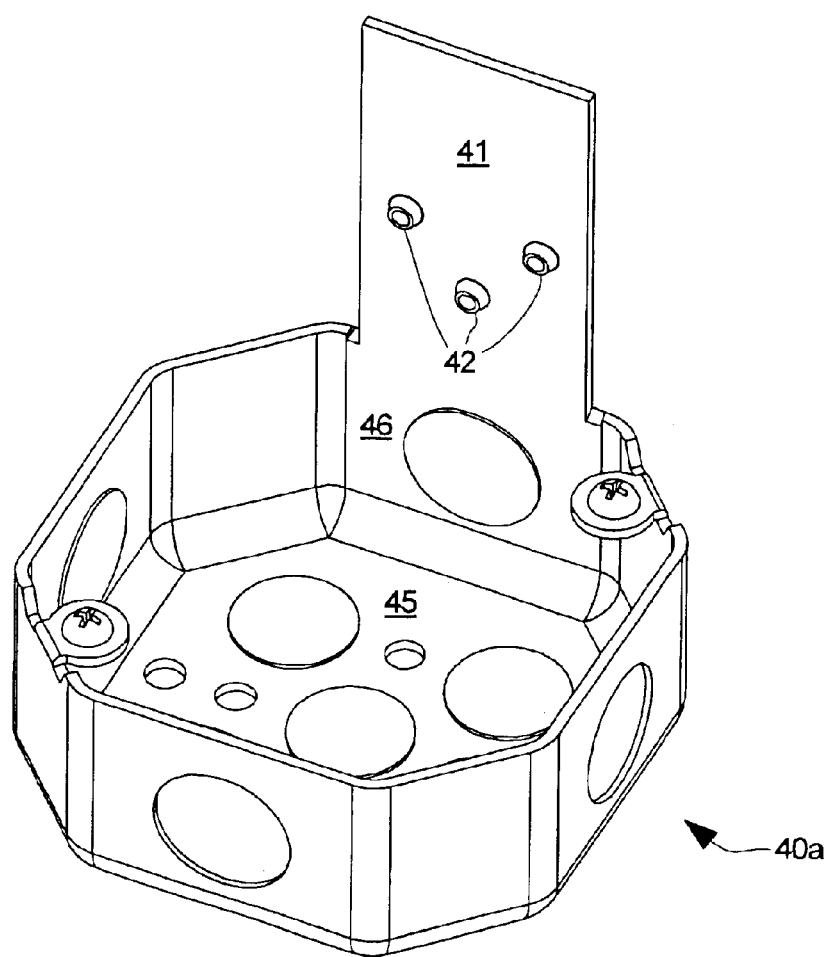
FIGS. 6a, 6b, 6c and 6d show an exemplary electrical box with built-in reinforcement.
Figure 6B:
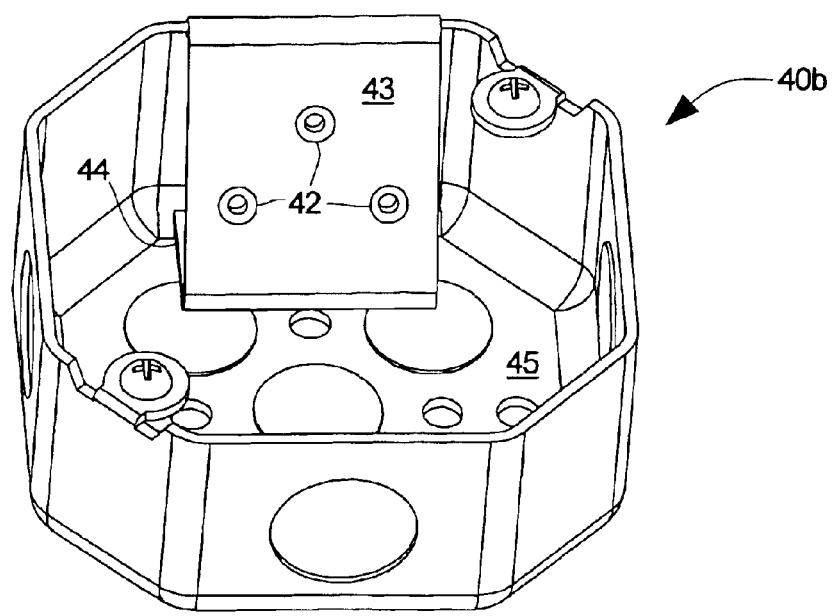
Figure 6C:
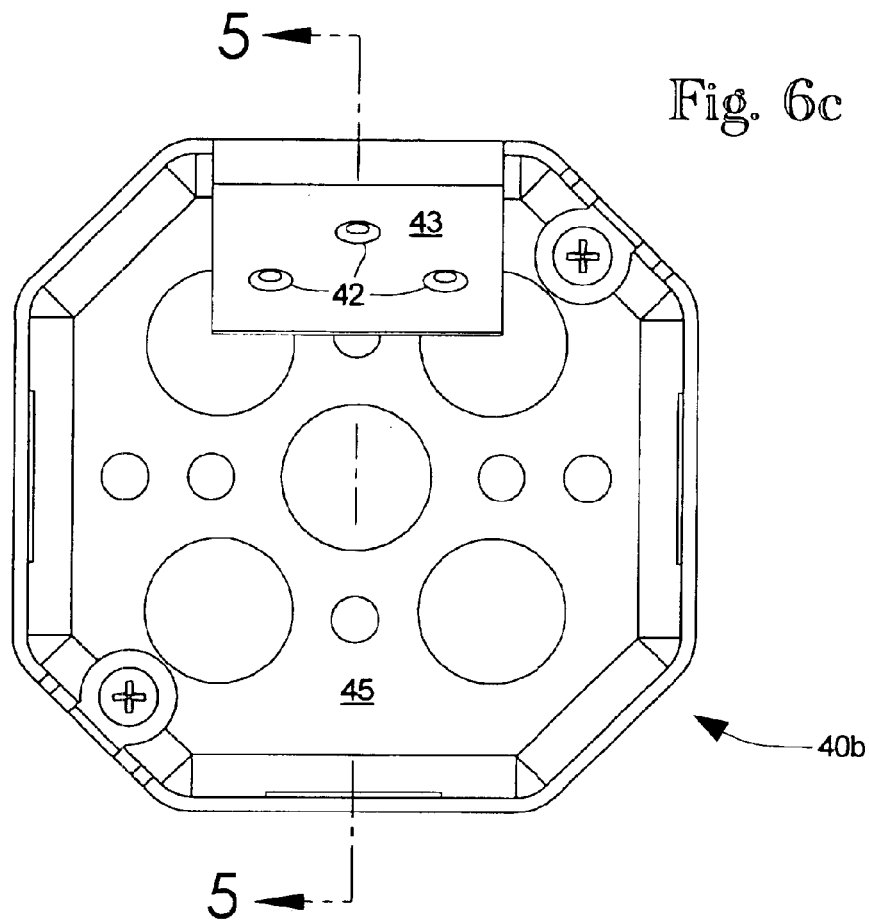
Figure 6D:
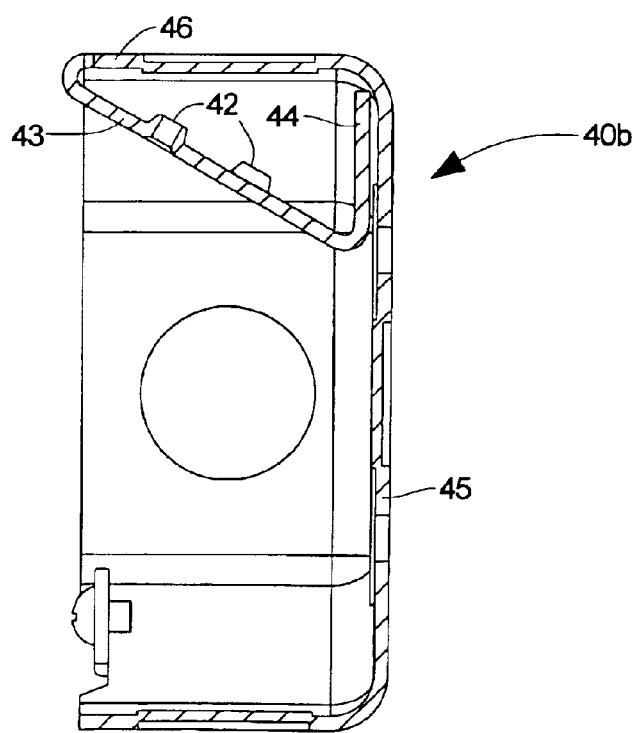

An electrical box may optionally have a reinforcing bracket built in. FIGS. 6a–d (herein after FIG. 6) show conceptually how this might be done in a metal-type box. Referring to FIG. 6a, an electrical box 40a is made in an intermediate stage, the box having a top 45, sides, and an unbent flap 41. Electrical box 40a may be fashioned from usual processes for electrical box manufacture, including stamping, pressing, punching, spot welding and other techniques. In this example and prior to this stage, fastener features 42 have been stamped prior to the next step. Those fastener features might be, for example, screw guides, nail guides, or conical or countersunk structures for securing a screw head. In that step, flap 41 is bent as shown in FIG. 6b, to form a brace 43 and a top interface portion 44 meeting with top 45. Now it is to be understood that this step may actually include several successive steps in which bends are progressively made to flap 41. FIG. 6c also shows the completed configuration as seen through the bottom of the box. FIG. 6d shows a sectional view through the axis labeled 5. Now although it is not shown, sidewall 46 is preferably pre-punched or drilled with holes for fasteners to pass through when inserted in 42, by which the installer may avoid drilling operations. This electrical box does not include wings or other extra-box support structures, but rather relies on the bracing structure formed by brace 43 and top interface portion 44 to stabilize the attachment of the electrical box 40b to a structural member. Preferably, at least three fastener features are included, as shown, in at least two axes to form a tri-point securement geometry. Electrical box 40b may be considered to be an "old work" or "rework" type box, as it may be conveniently installed to a finished ceiling. To do so, an installer would (1) find an attachable structural member, (2) cut a matching hole in the drywall, paneling, or other wall structure so the electrical box may be positioned next to the structural member, (3) insert the box and (4) fasten the box to the structural member through fastener features 42.

Figure 7:
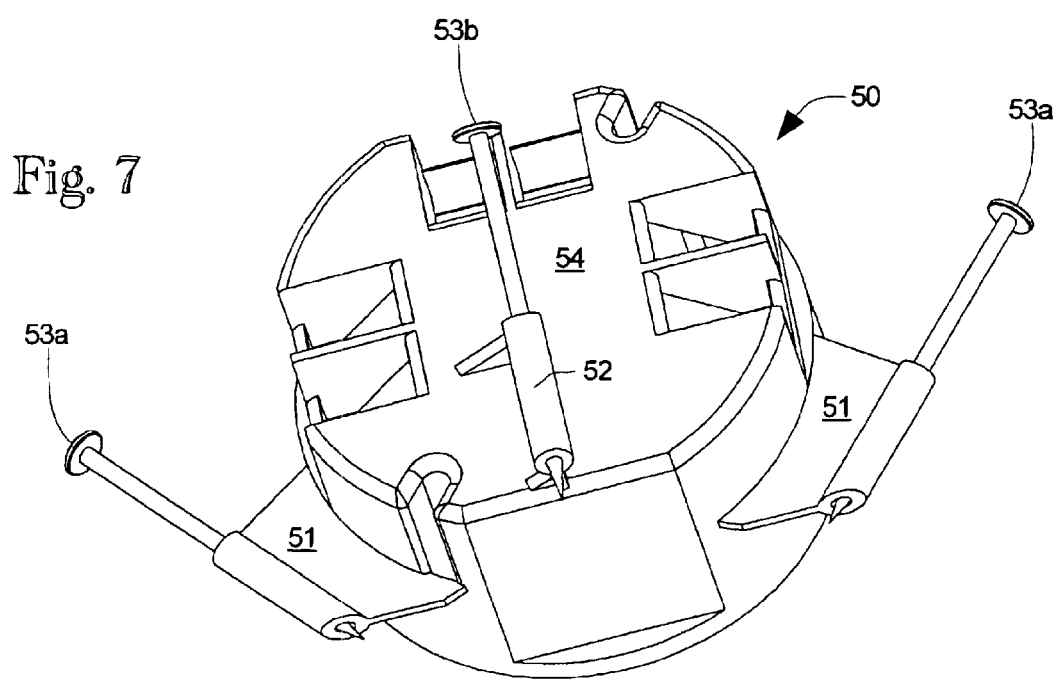
FIG. 7 shows an alternate bracing electrical box with three flanges.

FIG. 7 shows an alternate bracing electrical box 50 having three flanges. Those flanges include two horizontal flanges 51, which are included in conventional electrical boxes. An additional flange 52 is added substantially outside the plane formed by flanges 51, in this example attached to and above the electrical box top 54. Nails 53 are driven into a structural member during installation. Without the use of flange 52 and corresponding nail 53a, a weighted box has a tendency to rotate about an axis passing through the points where the nails 53b enter the structural member, where the most stress occurs in the nail material. Flange 52 and nail 53b, when used, prevent this rotation and keep the box in a more stable position. Now this box is more useful for new construction, as the task of driving the nails would be most difficult without tearing out a large section of wall necessary to swing a hammer or insert a power tool.

Figure 8A:
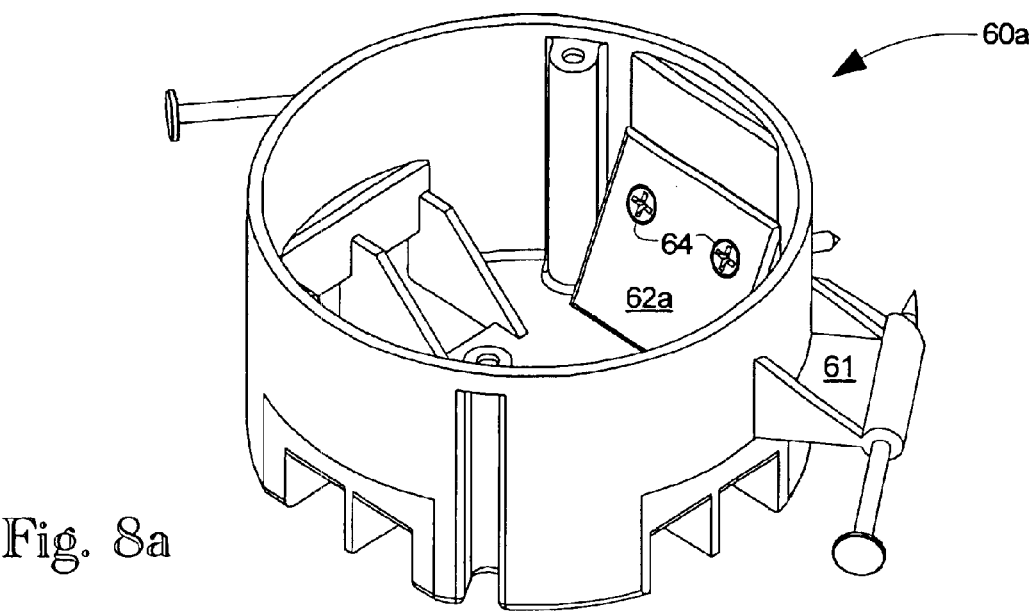
FIGS. 8a, 8b, 8c and 8d show an exemplary electrical box having flanges and an integrated bracket.
Figure 8B:
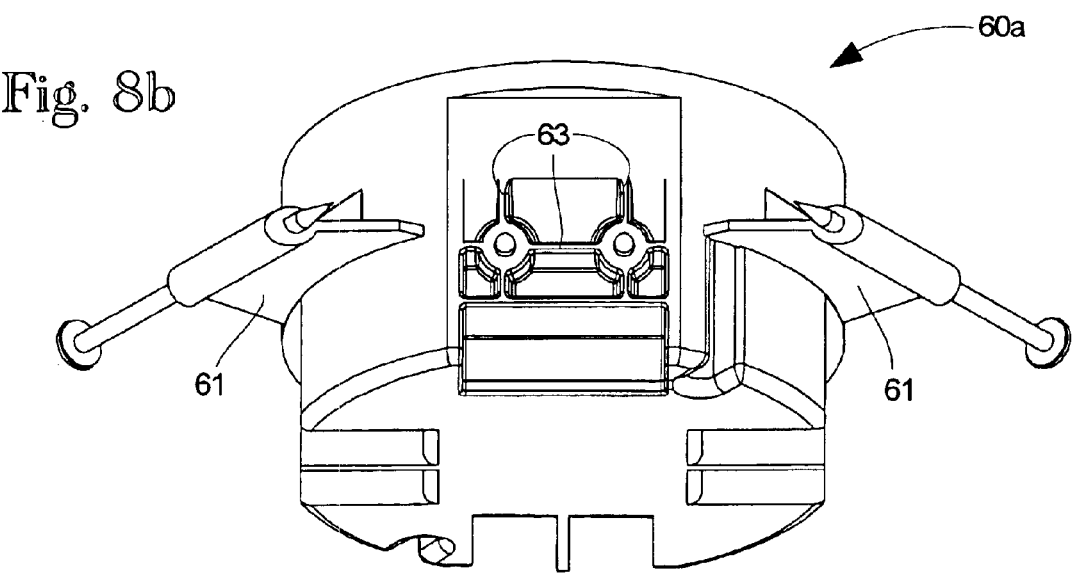
Figure 8C:
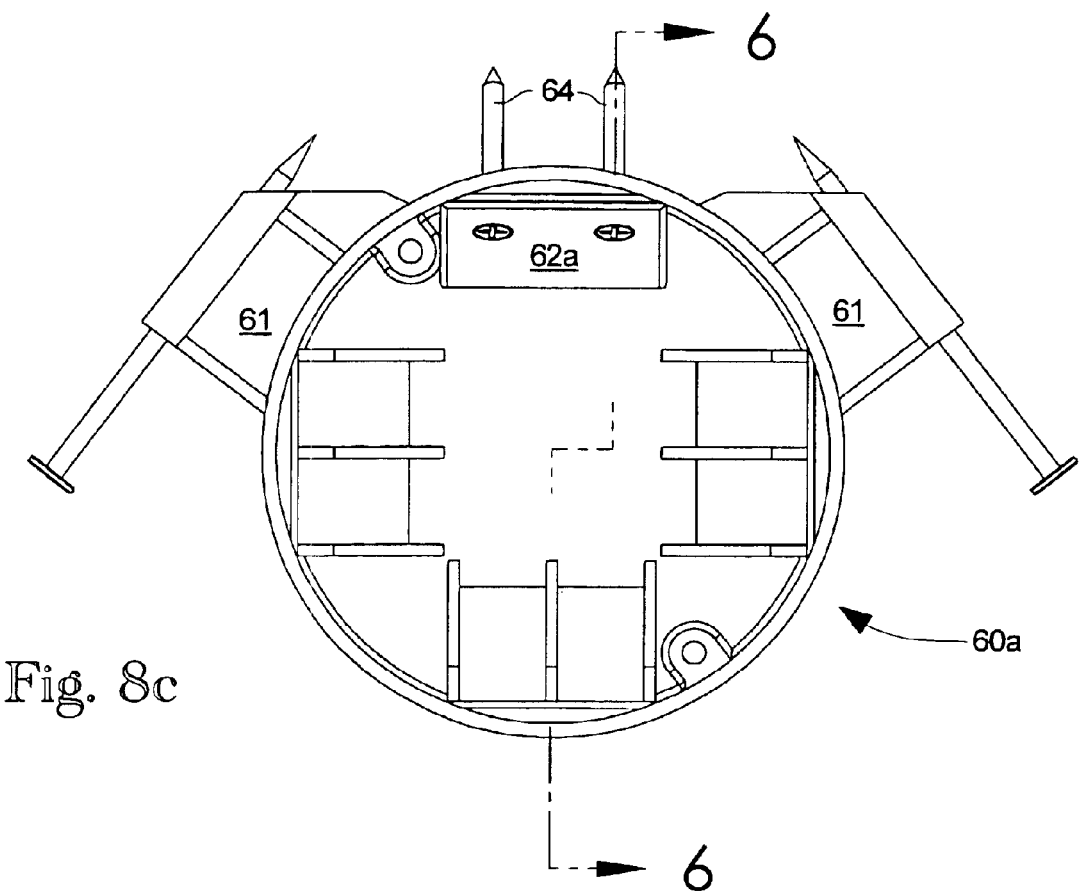
Figure 8D:
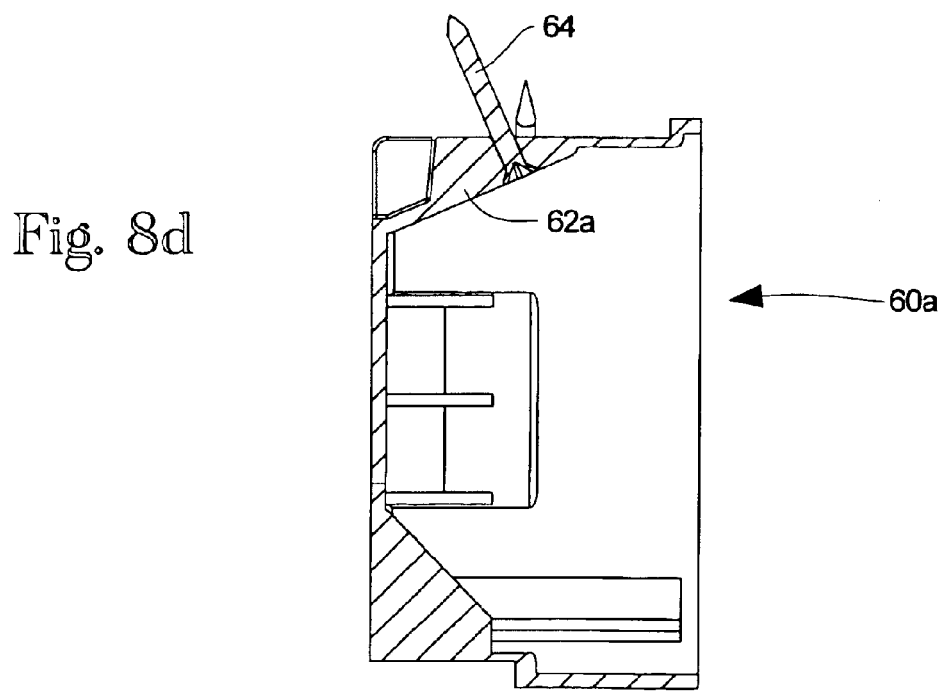

FIGS. 8a, 8b, 8c and 8d (herein after FIG. 8) show another bracing electrical box 60a having conventional flanges 61 and an integrated bracket 62a, FIG. 8a showing a perspective view of the box internal space, FIG. 8b shows a view of the outside of the box looking at the sidewall in adjacency to the bracket, FIG. 8c shows a bottom view of the box and FIG. 5d shows a sectional view in the axis marked 6. In this example, bracket 62a is molded out of plastic and integral to the structure of the electrical box. Ribbing 63 may be provided to resist the force applied by fasteners 64 when attached, while minimizing the amount of plastic material needed. This particular electrical box is useful for new installations where access to the structural member is not restricted.

Figure 9A:
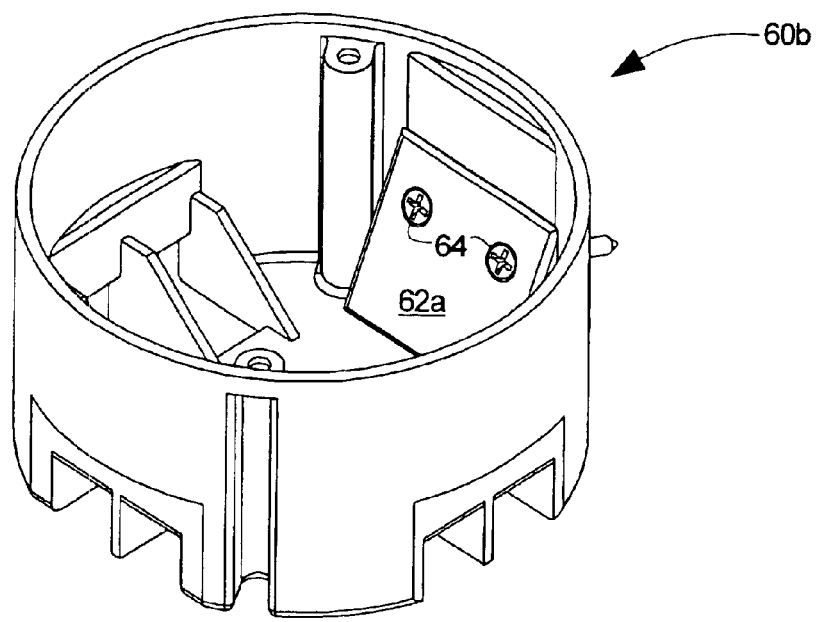
FIGS. 9a and 9b show an alternate electrical box having reinforcement.
Figure 9B:
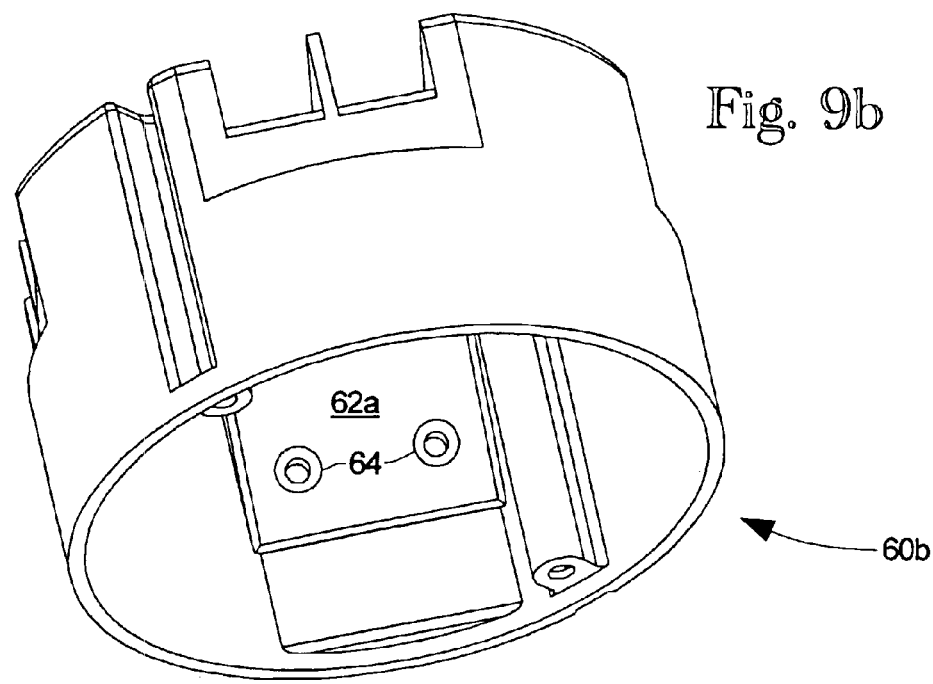

Shown in FIGS. 9a and 9b is an alternate electrical box 60b showing two different perspective views to the interior of the box. Electrical box 60b has the same integrated bracket 62a and ribbing 63 as box 60a of FIG. 8, but omits flanges 61. This box may be installed in a similar manner to the box 40a of FIG. 6, and is considered to be an "old work" type box.

Figure 10A:
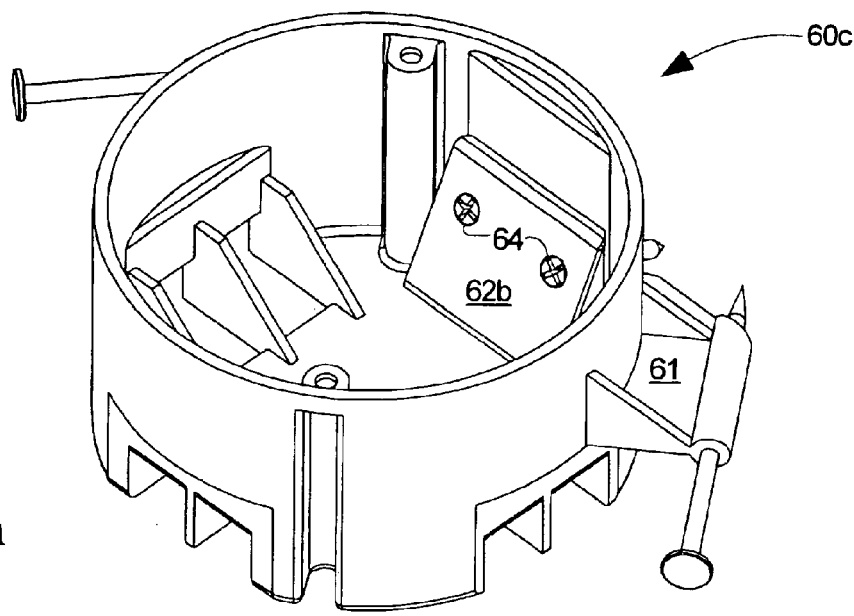
FIGS. 10a, 10b, 10c, 10d and 10e show another exemplary electrical box with flanges and an insert molded reinforcement.
Figure 10B:
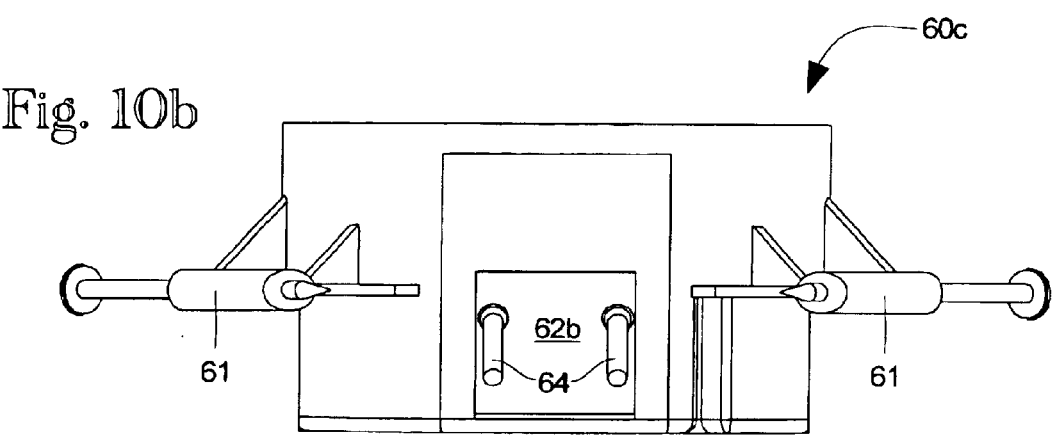
Figure 10C:
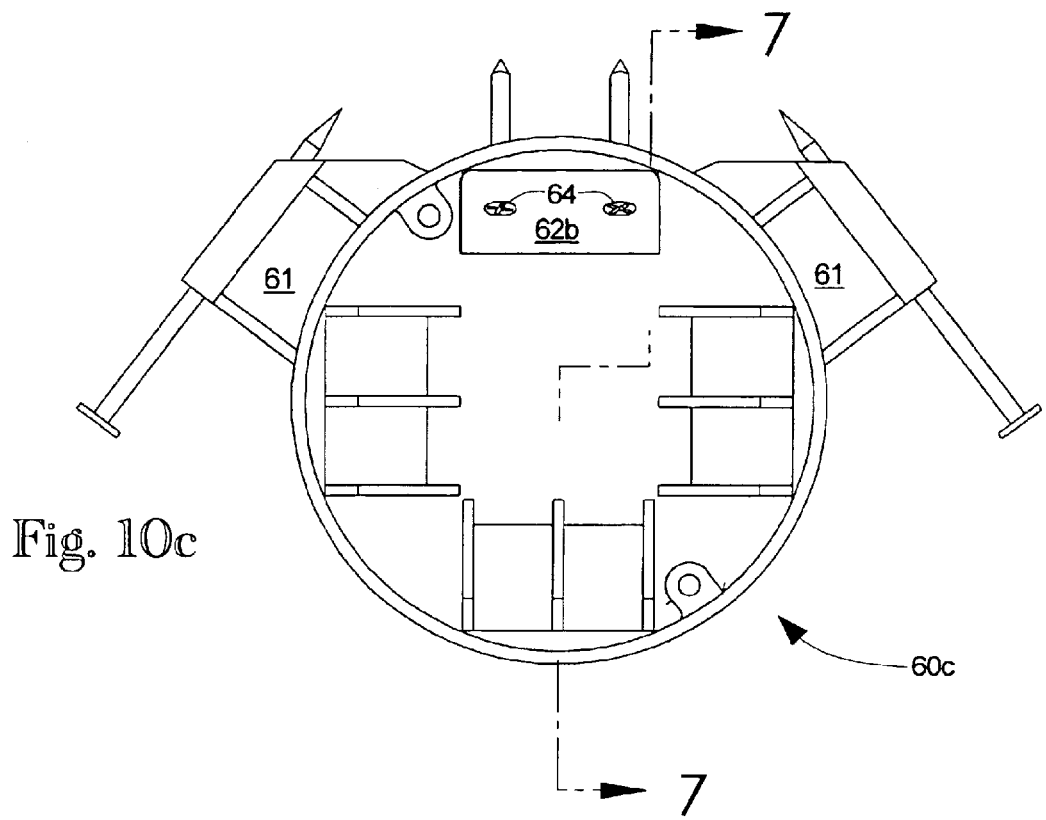
Figure 10D:
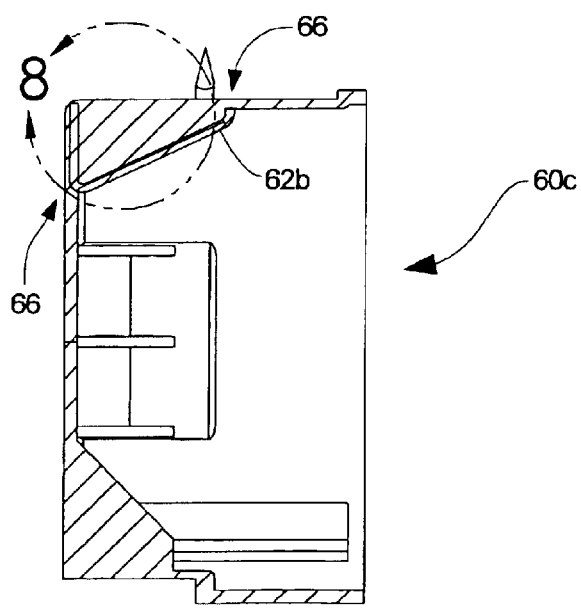
Figure 10E:
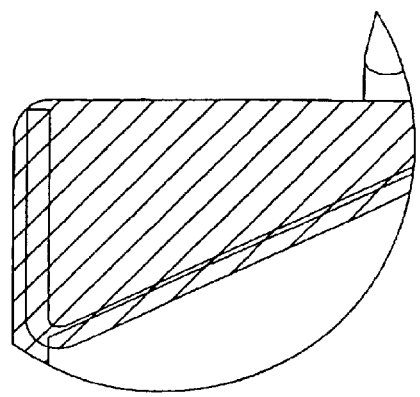

FIGS. 10a, 10b, 10c, 10d and 10e (herein after FIG. 10) show another bracing electrical box 60c having conventional flanges 61 and an insert molded bracket 62b, FIG. 10a showing a perspective view of the box internal space, FIG. 10b showing a view of the outside of the box looking at the sidewall in adjacency to the bracket, FIG. 10c shows a bottom view of the box, FIG. 10d showing a sectional view in the axis marked 7, and FIG. 10e showing the detail in the area marked 8. In this example, bracket 62b is molded in place during the molding process. Bracket 62b might be made of any stiff, strong and temperature insensitive material, for example steel, aluminum, brass, wood, carbon fiber, or other metal alloy or composite material, that withstands the temperatures of the plastic molding process and provides the desired reinforcement. Bracket 62b is placed in appropriate position inside the electrical box mold at the time the plastic part of the box is fabricated, the plastic generally encompassing or surrounding the bracket sufficiently to hold the bracket in place so that it does not become dislodged through ordinary use. Additional thicknesses of plastic material may be fashioned at the points of stress, for example 66 where bracket 62b meets the sidewall of the box and more particularly 65 where bracket meets the top of the box. Electrical box 60c is considered to be a "new work" type box.

Figure 11A:
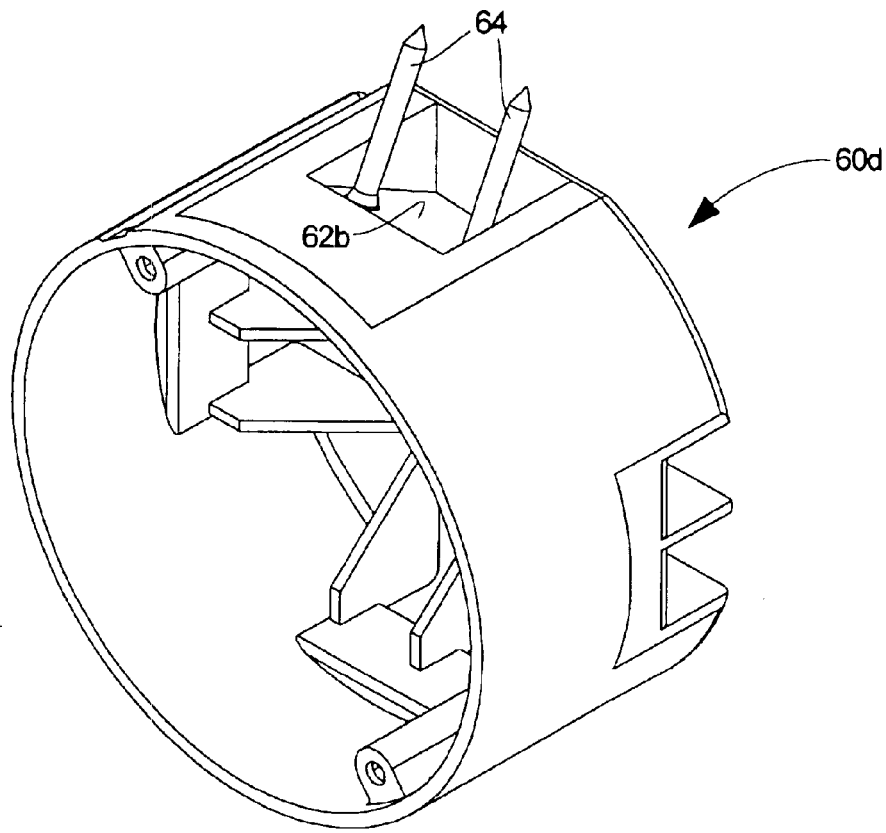
FIGS. 11a and 11b show another exemplary reinforced electrical box.
Figure 11B:
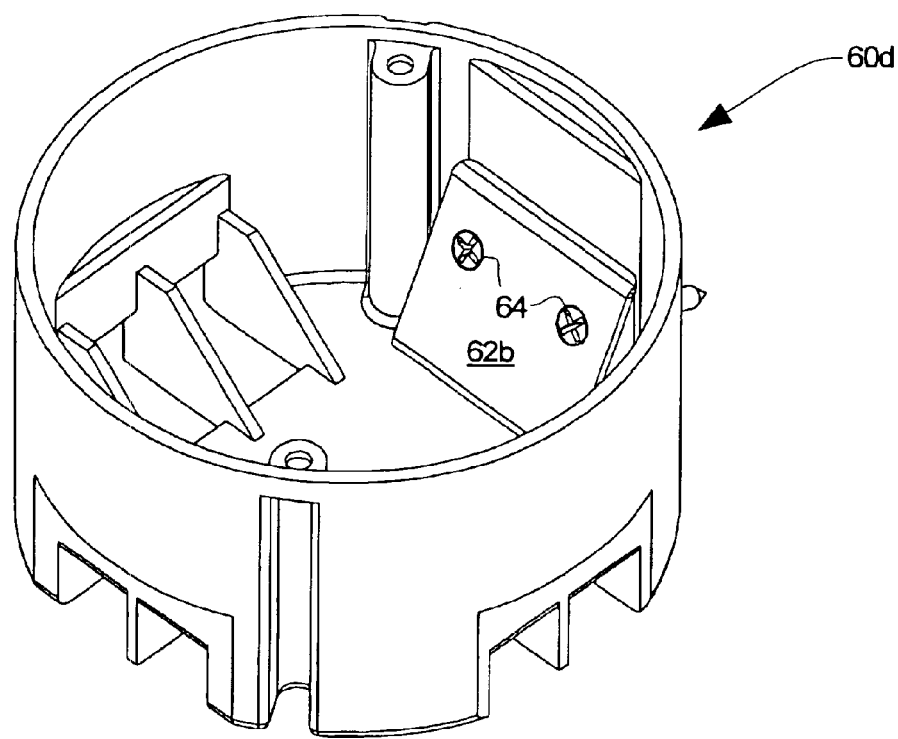

FIGS. 11a and 11b show an alternate electrical box 60d similar to the box 60c of FIG. 10, with FIGS. 11a and 11b showing two different perspective views to the interior of the box. Electrical box 60d has the same insert molded bracket 62b as box 60a of FIG. 10, but omits flanges 61. This box may also be installed in a similar manner to the box 40a of FIG. 6, and is considered to be an "old work" type box. Now the above described boxes may include alignment features, such as tabs, to align the electrical box into proper position with respect to the ceiling surface, particularly if the boxes are intended for old-work installations.

Figure 12A:
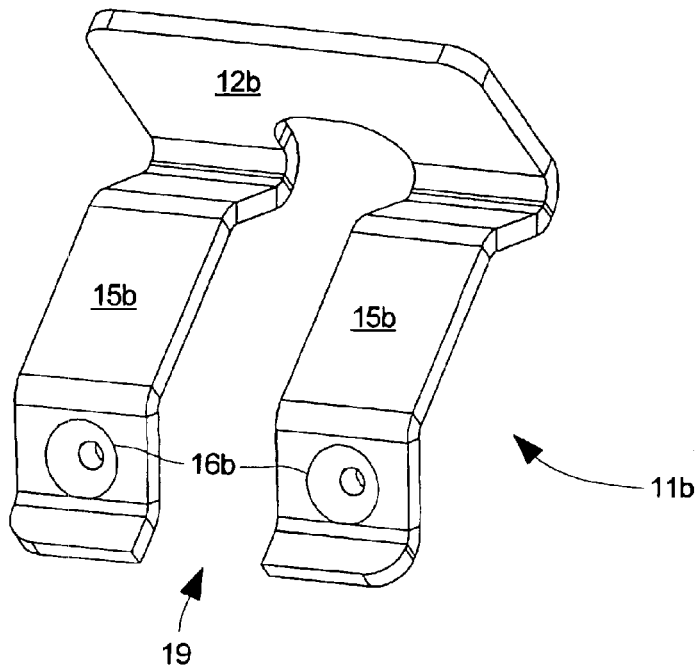
FIGS. 12a, 12b and 12c show an alternate reinforcing bracket.
Figure 12B:
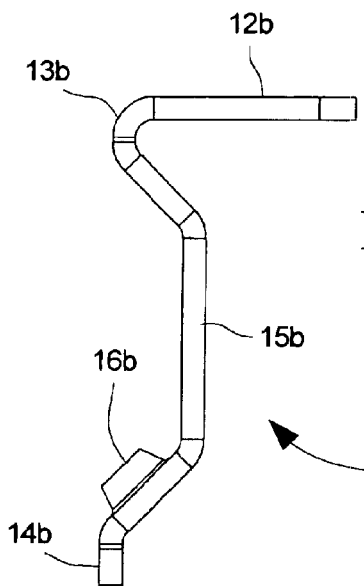
Figure 12C:
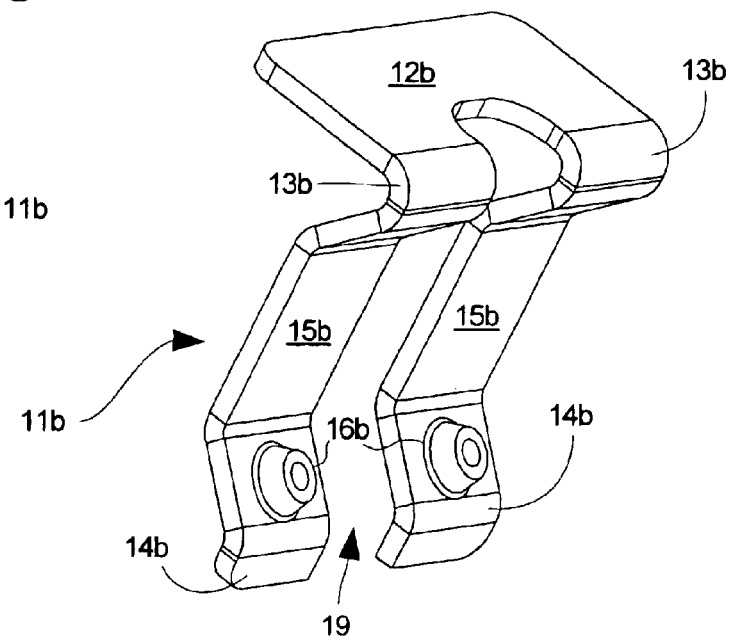

FIGS. 12a, 12b, and 12c show an alternate configuration of a reinforcing bracket 11b, including FIGS. 12a and 12c showing perspective views and FIG. 12b showing a side view. This bracket 11b includes a substantially flat surface 12b for mating with the top of an electrical box. Mating surfaces 13b and 14b are provided to rest against an electrical box sidewall, that sidewall preferably being flat. Two legs 15b extend between mating surfaces 13b and 14b connecting the bracket portion including mating surface 12b with the bracket portions containing fastener features 16b. A separation 19 is provided between the two legs 15b to permit mounting around an obstruction in the electrical box, for example a screw boss. The compressive portion of this bracket 11b is small, and is mainly around the bend at 13b. Because of this, this bracket is preferably constructed of stiffer and/or stronger materials than that of 11a to maintain a similar bracing capacity.

FIGS. 13a, 13b and 13c show another alternate configuration of a reinforcing bracket of the type of 11a, FIGS. 13a and 13c showing perspective views and 13b a side view. Bracket 11c includes a top mating interface 12c, fastener features 16c, and a strut portion 15c. This bracket is intended to fit an electrical box having a substantial cylindrical sidewall, for example the 3 inch ceiling electrical box shown in FIGS. 3a–c, and thus curved regions 13ca and 14ca are provided to mate thereto. Side interface areas 13cb and 14cb may be used to mate to a fastener boss, as in the bracket of 11a. Bends 17c and 18c are included to orient strut portion 15c, top mating surface 12c, and side interface areas 13ca, 13cb, 14ca and 14cb in positions that will mate well with the intended electrical boxes, provide reinforcement and orient fastener features in a direction that assists the insertion of fasteners therein into a structural member. Bracket 11c may be made using similar methods and materials as to that of bracket 11a.

Now it is preferred that reinforcement brackets, devices or features be designed to consume a minimal amount of the interior volume, so as to maximize the number of wires and electrical connections that can be made within the electrical box.

A kit containing a reinforcement device and necessary fasteners may be advantageously assembled for the convenience of the installer. Such a kit might be included, for example, in the product packaging of an electrical appliance, for example a ceiling fan or light fixture, providing added convenience to the installer of the product in situations where the use of the bracket is desirable. A fastener bit suitable for insertion into a drill may also add to the convenience of the installer at a reasonable expense.

A preferred fastener type for use with reinforcement devices and brackets is the pilotless screw, as commonly used in decking, fencing and drywall applications. That type of screw can be driven into woods used for construction as well as many plastics with minimal splitting and/or stretching of the material. The use of that type of screw simplifies the installation of the bracket by reducing the need for drilling pilot holes, which under many circumstances will be awkward given the overhead working position and the restrictions of available access to the interior of the particular electrical box, and further require the use of long drill bits or adapters which may not be in the equipment inventory of typical installers. The use of screws is also preferred to mitigate the effects of thermal and humidity cycles, which is a known problem with nails.

While reinforcing brackets, devices, and electrical boxes containing reinforcement and the use of those have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A reinforcement bracket capable of being secured to the interior of an electrical box, the electrical box having interior top and interior side regions, the electrical box further having at least one wiring access aperture, said bracket being further securable to a structural member in structural adjacency to the electrical box, said bracket being capable of securing the movement of the electrical box relative to the structural member against the weight of a fixture fastenable to the electrical box, said bracket comprising:

a top interface providing a mating between said bracket and the interior top region of the electrical box;

a side interface providing a mating between said bracket and the interior side region of the electrical box;

a rigid member providing resistance to a compressive force applied between said top interface and said side interface;

a mating feature for a fastener, said feature including a hole through which a fastener may be inserted, said feature further providing an attachment point for the fastener, said feature oriented in a position relative to said bracket such that the fastener may be installed through the access aperture to secure said bracket to a structural member in structural adjacency to the electrical box; and wherein said bracket is formed of zinc plated sheet or plate steel.

2. A reinforcement bracket according to claim 1, wherein the side interface provides a mating against a substantially flat surface.

3. A reinforcement bracket according to claim 1, wherein the side interface provides a mating against a fastener boss.

4. A reinforcement bracket according to claim 1, wherein the side interface provides a mating against a substantially curved surface.

5. A reinforcement bracket according to claim 1, wherein the side interface provides matings against any two of a substantially flat surface, a substantially curved surface, and a fastener boss.

6. A reinforcement bracket according to claim 1, wherein the bracket is adapted to be installed in two different sized electrical boxes.

7. A reinforcement bracket according to claim 6, wherein the bracket is insertable into three and four inch electrical boxes, and includes matings for both.

8. A reinforcement bracket according to claim 1, wherein the bracket is adapted to be installed in two different internally shaped electrical boxes.

9. A reinforcement bracket according to claim 1, wherein the top interface provides a mating against a substantially flat surface.

10. A reinforcement bracket according to claim 1, wherein said mating feature for a fastener is set to position a fastener at about 60 degrees from the vertical for an electrical box mounted to a vertical structural support surface.

11. A reinforcement bracket according to claim 1, wherein said mating feature for a fastener is configured to position a fastener such that a driving force may be directly applied thereto by a tool external to the electrical box.

12. A reinforcement bracket according to claim 1, wherein a downward force on the electrical box is converted partially to a horizontal force vector in the direction of the structural member.

13. A reinforcement bracket according to claim 1, wherein:
the electrical box utilizes fastener positioning members that position fasteners in the same plane; and
said mating feature for a fastener is set to position a fastener substantially outside that plane.

14. A reinforcement bracket according to claim 1, wherein said mating feature for a fastener may accept a pilotless screw, and further that said mating feature for a fastener is set at an angle that permits the turning of the screw with a straight-shafted screwdriver without angle changing adapters, the handle of the screwdriver being outside the confines of the electrical box.

15. A reinforcement bracket according to claim 1, wherein said rigid member includes a strut-like portion between said top interface and said said interface.

16. A kit for reinforcing a ceiling electrical box containing a reinforcement bracket capable of being secured to the interior of the electrical box, the electrical box having interior top and interior side regions, the electrical box further having at least one wiring access aperture, said bracket being further securable to a structural member in structural adjacency to the electrical box, said bracket being capable of securing the movement of the electrical box relative to the structural member against the weight of a fixture fastenable to the electrical box, said kit comprising:

at least one fastener;
a reinforcement bracket having a top interface providing a mating between said bracket and the interior top region of the electrical box, said bracket further having a side interface providing a mating between said bracket and the interior side region of the electrical box, said bracket additionally including a rigid member providing resistance to a compressive force applied between said top interface and said side interface, said bracket further having a mating feature for said fastener, said feature providing an attachment point for said fastener, said feature oriented in a position relative to said bracket such that said fastener may be installed through the access aperture to secure said bracket to a structural member in structural adjacency to the electrical box, said bracket being formed of zinc plated sheet or plate steel.

17. A kit according to claim 16, wherein said fastener is a pilotless screw.

18. A kit according to claim 16, wherein the rigid member of said reinforcement bracket includes a strut-like portion between the top interface and the said interface of said reinforcement bracket.

19. A method of reinforcing a ceiling electrical box, the electrical box having interior top and interior side regions, the electrical box further having at least one wiring access aperture, the electrical box being secured to a structural member in structural adjacency to the side region of the electrical box, comprising the step of:

inserting a reinforcement bracket into the interior of the electrical box, the bracket having a top interface providing a mating between said bracket and the interior top region of the electrical box, the bracket further having a side interface providing a mating between said bracket and the interior side region of the electrical box, the bracket also having a rigid member providing resistance to a compressive force applied between said top interface and said side interface, the bracket further having a mating feature for a fastener, said feature providing an attachment point for at least one fastener, said feature oriented in a position relative to said bracket such that the fasteners may be installed through the access aperture to secure said bracket to a structural member in structural adjacency to the electrical box, said inserting bringing the bracket into a position wherein the top interface is adjacent to the interior top region of the electrical box and wherein the side interface is adjacent to the interior side region of the electrical box, the bracket being formed of zinc plated sheet or plate steel; and securing the bracket to the structural member by driving fasteners into the side region of the electrical box and further into the structural member, said securing bringing said fasteners attaching said bracket to the electrical box utilizing the feature providing an attachment point.

* * * * *